United States Patent
Ricci

[19]

[11] Patent Number: 5,156,568
[45] Date of Patent: Oct. 20, 1992

[54] CAR VENTILATOR

[76] Inventor: Russell L. Ricci, 225 Kitemaug Rd., Uncasville, Conn. 06382

[21] Appl. No.: 841,894

[22] Filed: Feb. 25, 1992

Related U.S. Application Data

[60] Continuation-in-part of Ser. No. 673,684, Mar. 22, 1991, abandoned, which is a division of Ser. No. 501,954, Mar. 29, 1990, Pat. No. 5,003,866.

[51] Int. Cl.$^5$ .................................................. B60J 7/08
[52] U.S. Cl. ........................................ 454/129; 454/900
[58] Field of Search ............... 454/96, 129, 134, 136, 454/162, 165, 900; 296/217; 49/70

[56] References Cited

U.S. PATENT DOCUMENTS

| | | | |
|---|---|---|---|
| 815,434 | 3/1906 | Kinzey | 98/93 |
| 941,917 | 11/1909 | Fulton | 98/99.7 X |
| 1,847,861 | 3/1932 | Bradbury | 98/2.13 |
| 2,294,363 | 9/1942 | Brockway | 454/136 X |
| 2,931,578 | 4/1960 | Thompson | 454/900 X |
| 4,113,302 | 9/1978 | Bos | 454/129 X |
| 4,702,518 | 10/1987 | Paerisch et al. | 454/129 X |
| 4,738,053 | 4/1988 | Biesenthal | 49/70 |
| 4,799,422 | 1/1989 | Birt | 98/2.13 |
| 4,864,920 | 9/1989 | Inagaki | 98/2.13 |
| 4,893,550 | 1/1990 | Cheng | 98/2.02 |
| 4,899,645 | 2/1990 | Wolfe et al. | 98/2.02 |
| 5,038,674 | 8/1991 | Merges | 454/136 |

FOREIGN PATENT DOCUMENTS

| | | | |
|---|---|---|---|
| 256313 | 7/1987 | European Pat. Off. | 98/2.14 |
| 291716 | 11/1988 | Japan | 98/2.18 |

*Primary Examiner*—Harold Joyce
*Attorney, Agent, or Firm*—McCormick, Paulding & Huber

[57] ABSTRACT

A ventilator insert to be received within the generally wedged-shaped confine provided by a hinged sunroof glass. The ventilator insert may have a powered impeller to positively move air between the external environment and the vehicle cabin which impeller may be powered by a self-contained power supply connected with a charging source such as a photovoltaic panel and/or the vehicle's own electrical system.

12 Claims, 17 Drawing Sheets

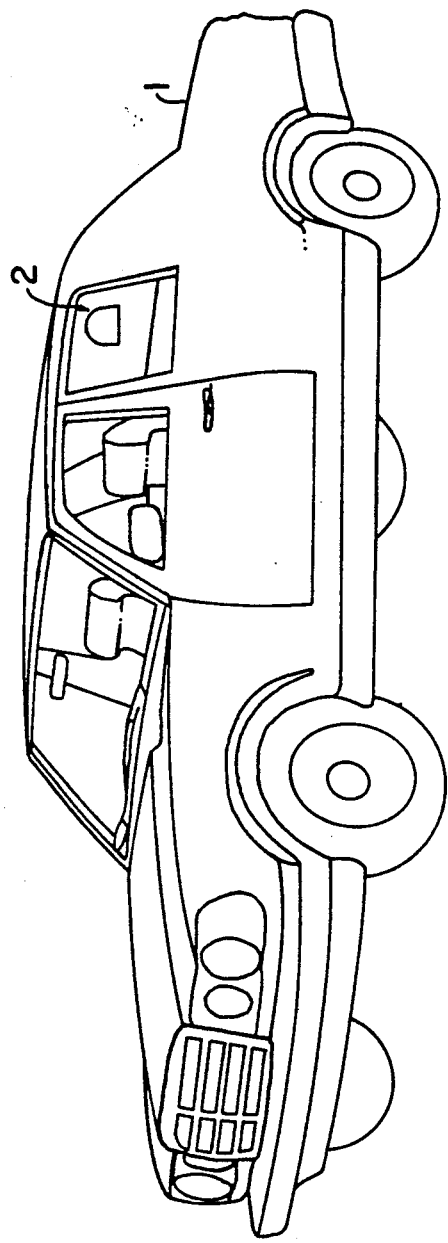
FIG. IA
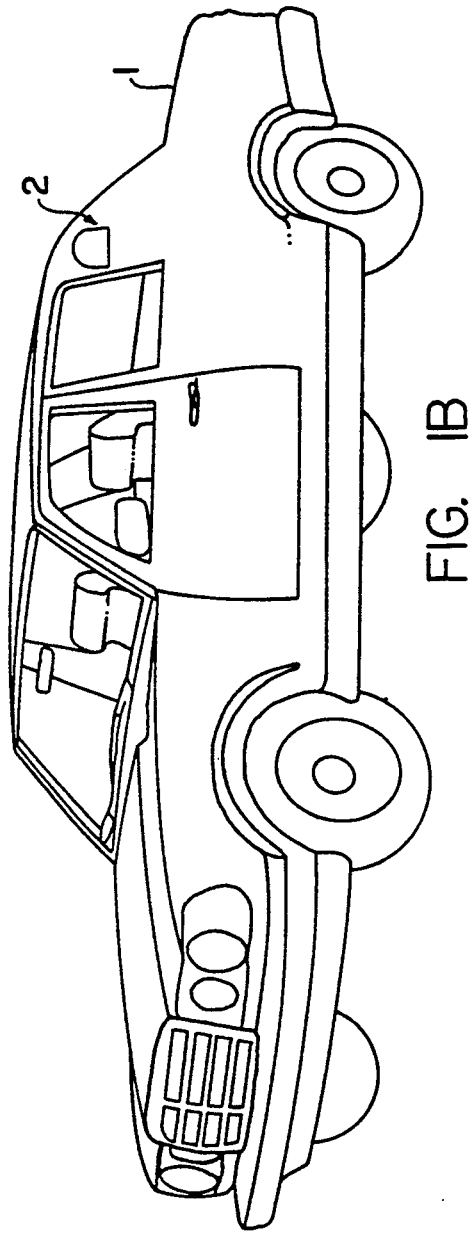
FIG. IB

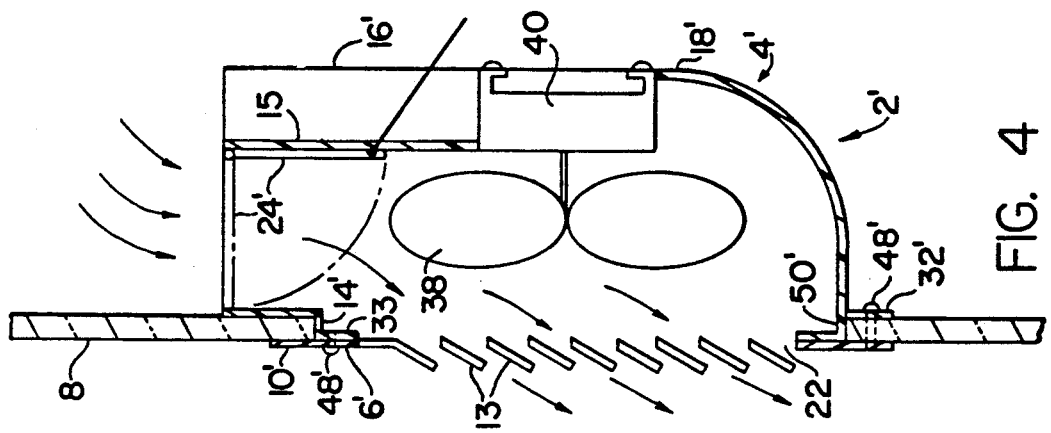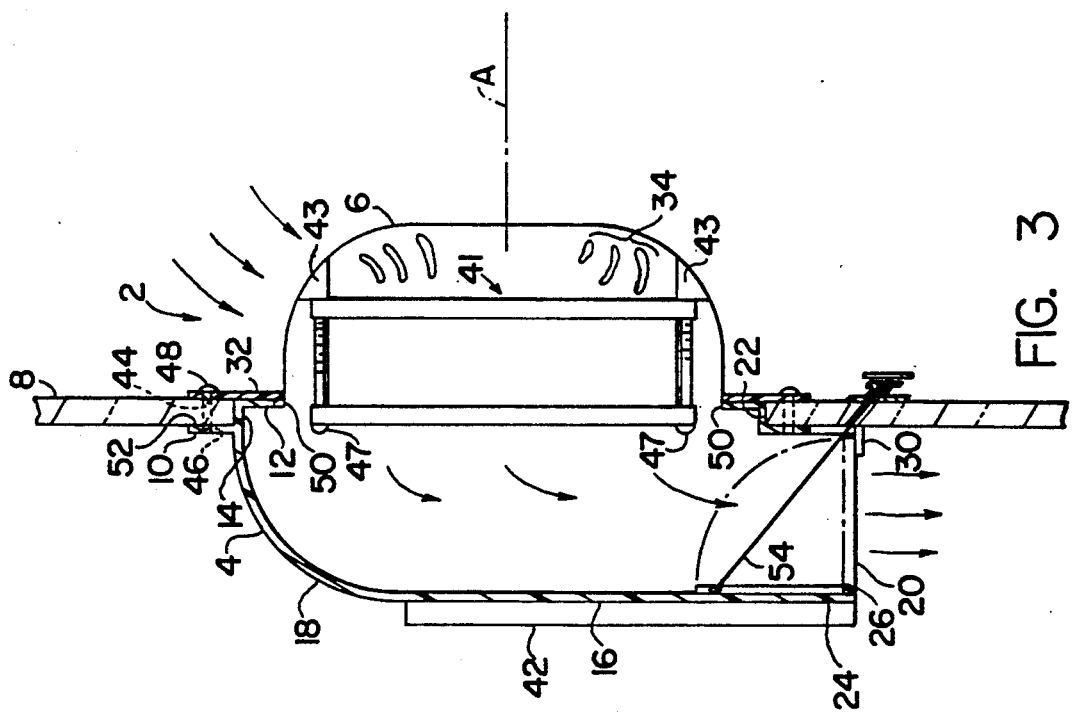

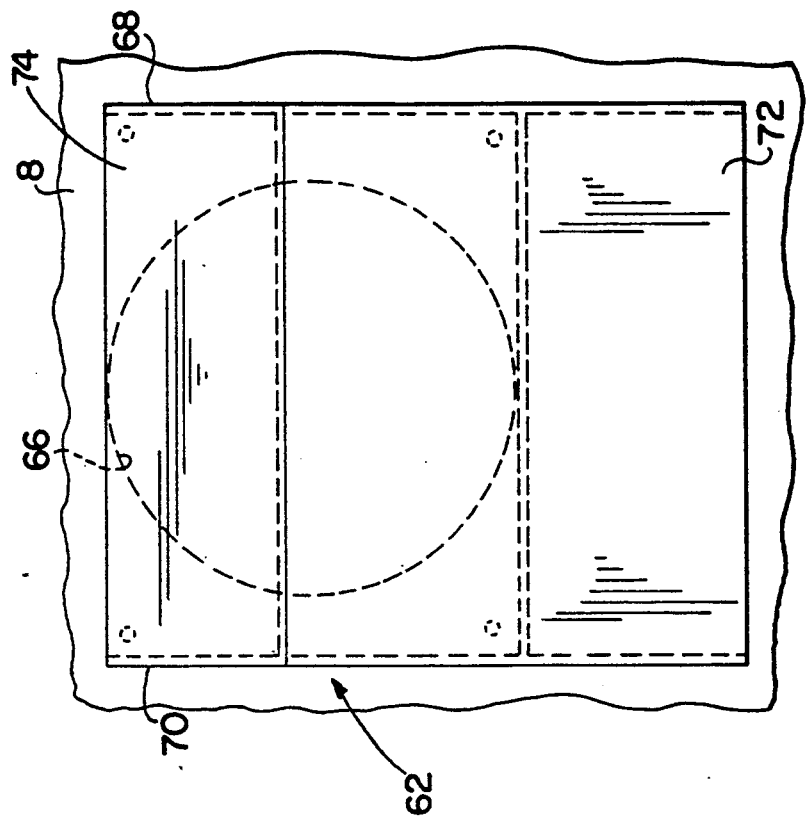
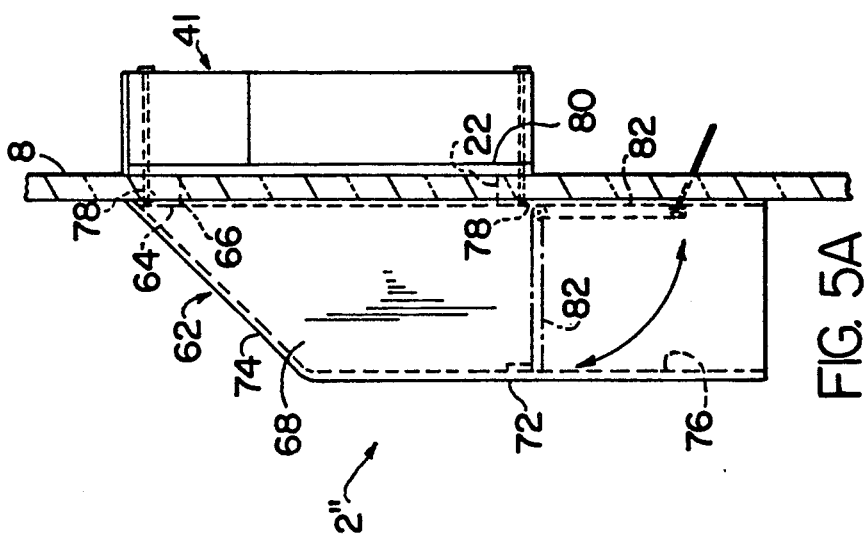

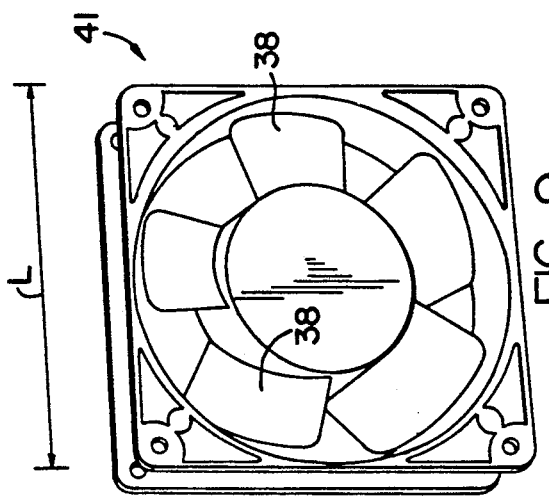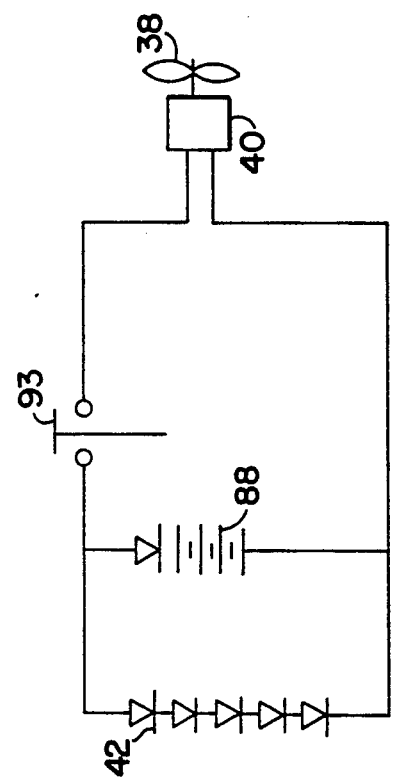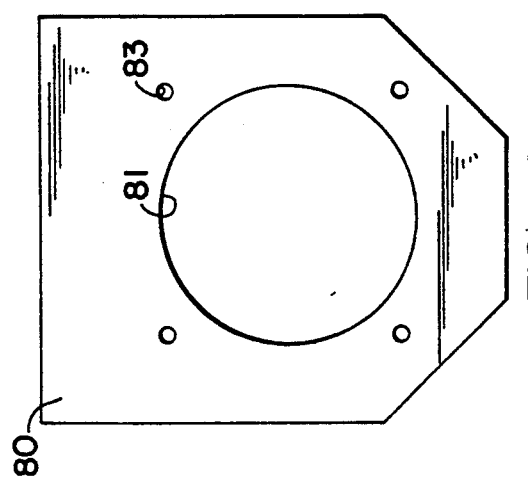

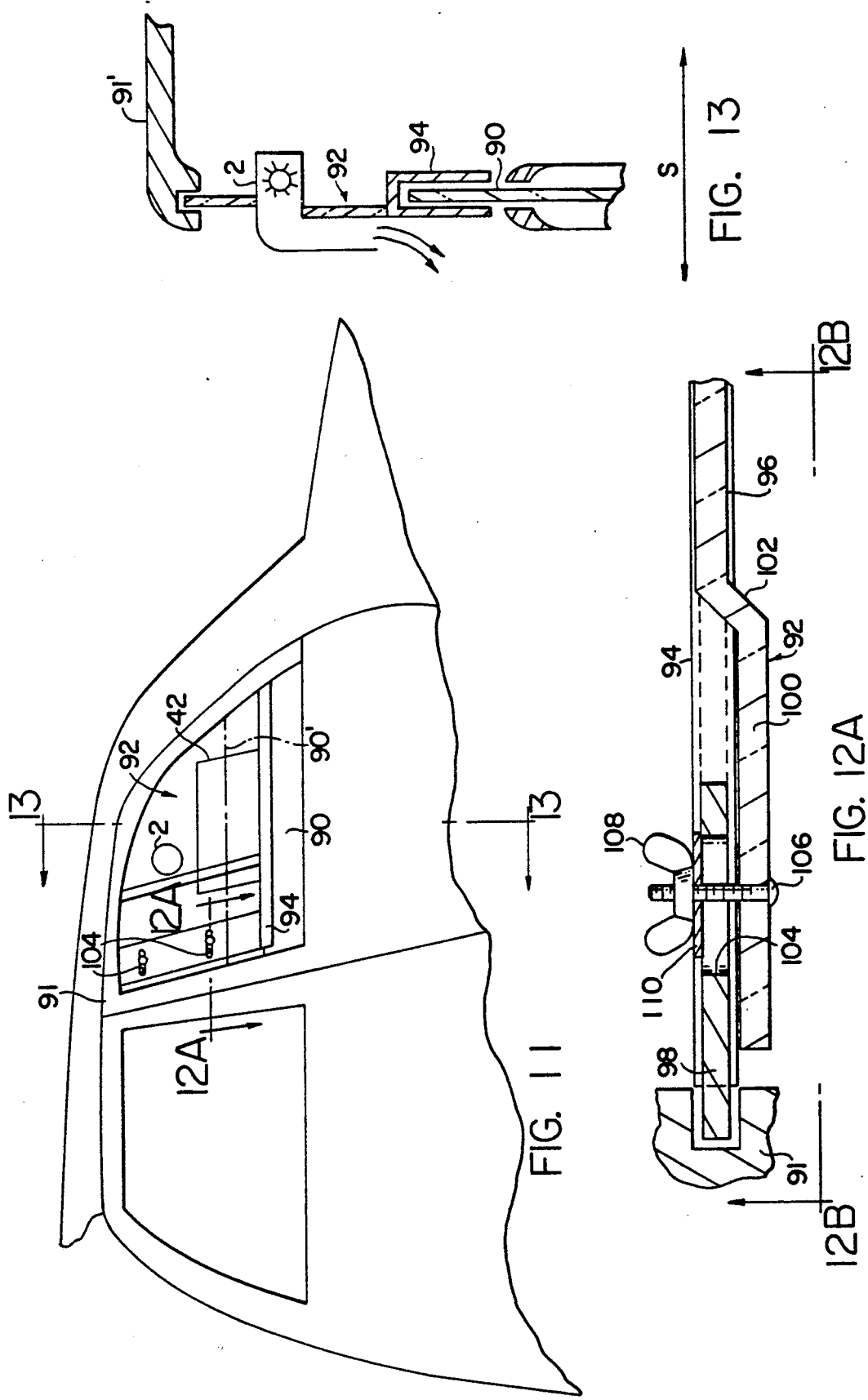

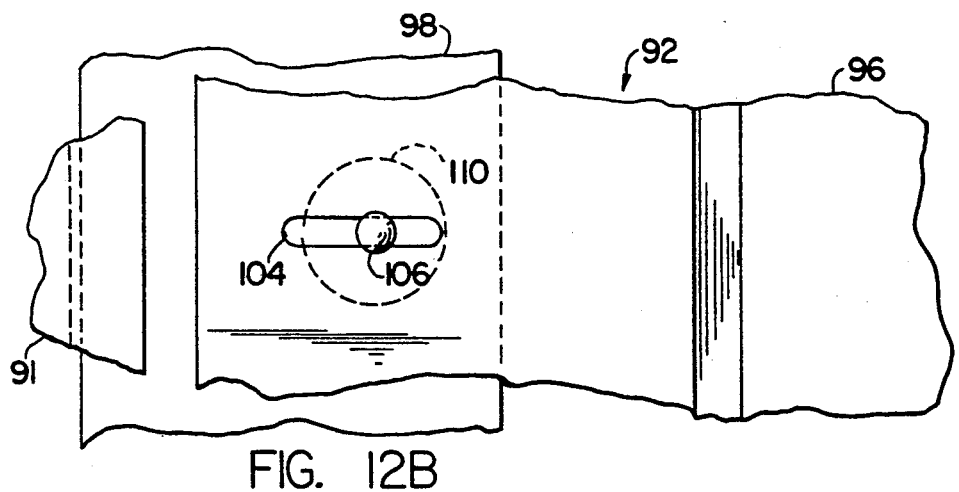
FIG. 12B
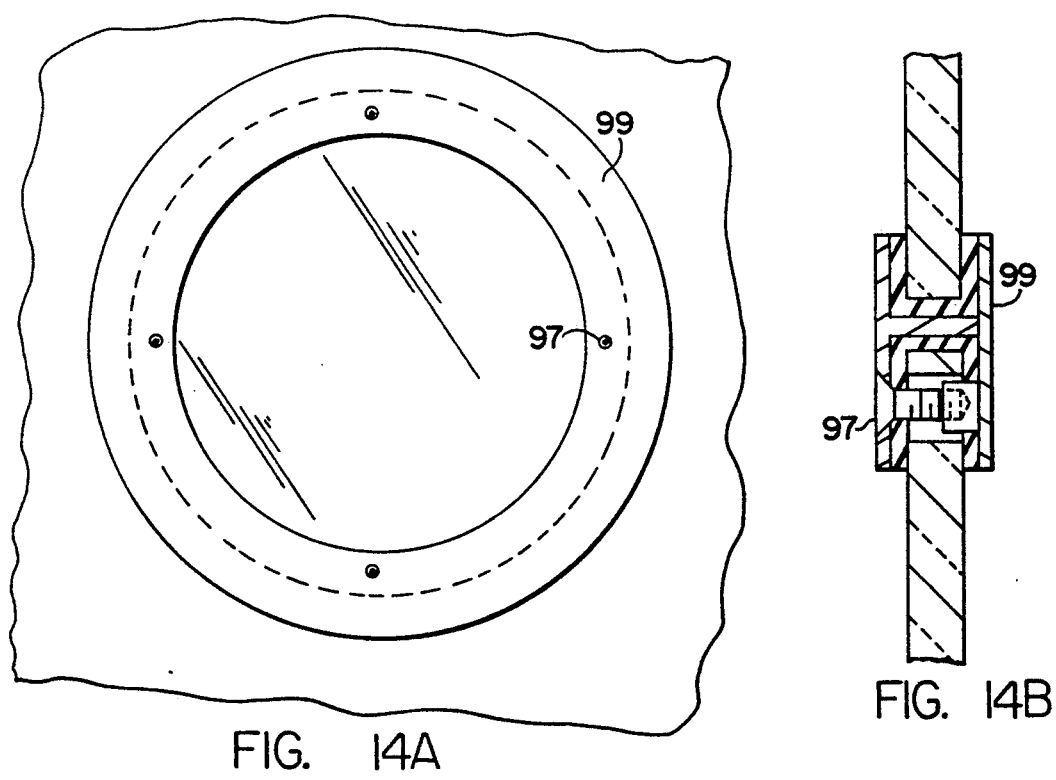
FIG. 14A
FIG. 14B

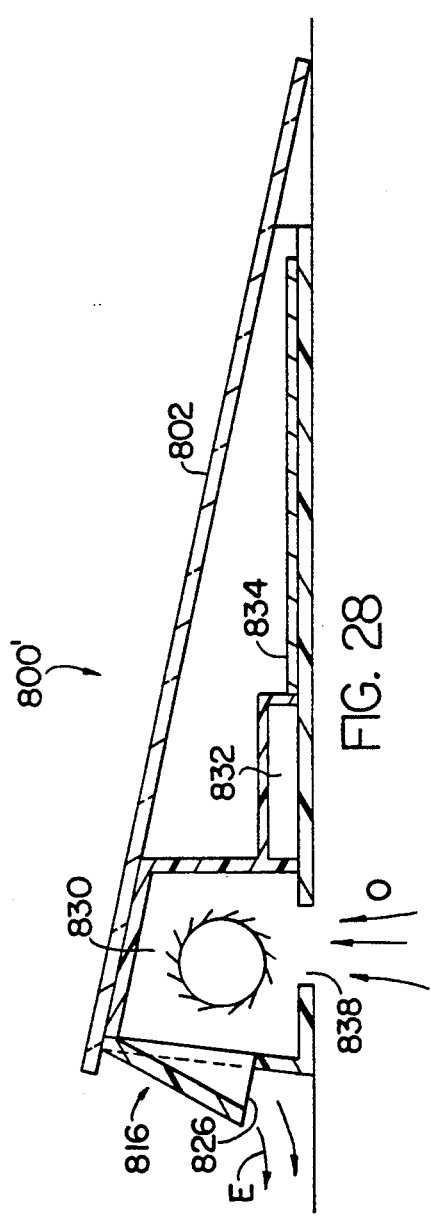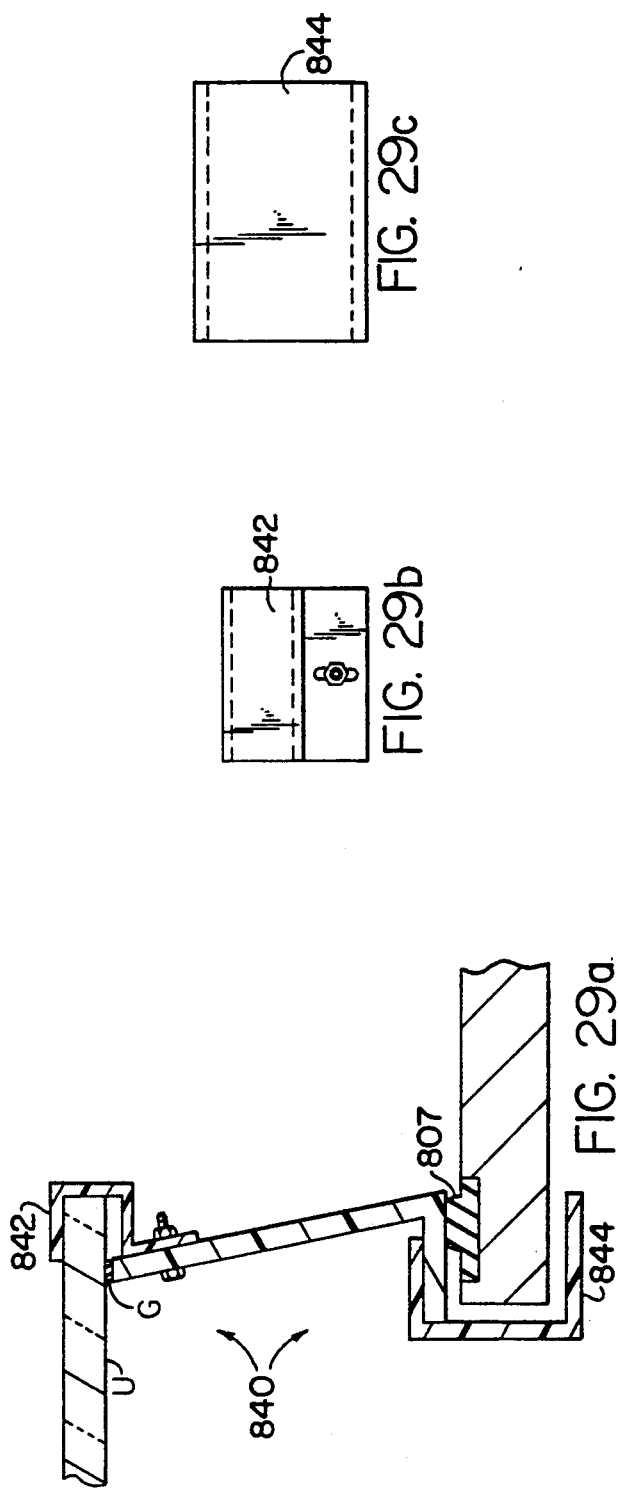

CAR VENTILATOR

This is a continuation-in-part of copending application Ser. No. 07/673,684 filed Mar. 22, 1990, now abandoned, which is a division of Ser. No. 07/501,954 filed Mar. 29, 1990 now U.S. Pat. No. 5,003,866.

BACKGROUND OF INVENTION

The present invention resides in a ventilator usable with an automobile or other similar vehicle for supplying fresh air to and exhausting entrapped air from the vehicle cabin when the vehicle is parked and more particular resides in a ventilator and associated system used integrally with a vehicle structure or as a portable, separate device to provide fresh, cooler air to the vehicle cabin while removing heated air otherwise entrapped within the cabin when the vehicle is parked and left in the sun or other environment which increases the standing temperature of the air in the cabin.

For security reasons, an automobile parked for any period of time requires that doors be locked and the windows be rolled up to deter the possible unwanted entry into the cabin by a potential intruder. However, when the vehicle cabin is enclosed such that the doors are locked and the windows are sealed, air entrapped within this space becomes heated by sunlight passing through the car windows. It has been found that the temperature of the air within the vehicle cabin in such circumstances may exceed 100 degrees Fahrenheit thereby making the cabin clearly unsuitable for human occupancy during the period when the vehicle is parked. In addition, animals which usually are left behind in a parked car cannot be confined without fresh, cool air and therefore must be provided with some ventilation in order that they may survive this extreme environment.

As a result, vehicle users normally leave open one or more of the vehicle windows in order that ventilation will be provided within the cabin so that upon returning to the vehicle, the vehicle cabin temperature will not be unbearable or that an animal left inside will not be overcome by this environment. One problem, however, experienced when windows are left partially open is the increased accessibility of the vehicle cabin to entry by a possible intruder. In addition, when animals are left behind in the vehicle, the partially open window provides an avenue by which such animal may escape out of the vehicle cabin and into oncoming vehicle traffic or into an unknown environment. Also, it is common that rain showers erupt unexpectedly in environments where continual heat is common. Rain entering through a partially open window often damages the usually expensive upholstery fabrics covering the walls, seats and dash of the vehicle interior.

Previously know systems have attempted to overcome these problems by installing into the vehicle ventilation system fans which provide ventilation to the cabin when the vehicle is parked. However, these previously known systems have usually always located a blower fan within the extensive ventilation duct work of the vehicle housed under the dashboard assembly and not within the vehicle cabin where the heated air rises and collects thus reducing the efficiency of the system to exhaust the heated air. Also, air drawn through the standard vehicle ventilation duct work by a ventilator fan when the vehicle is parked must travel through the convoluted duct work path and experiences drag for each linear distance moved along the duct work thereby further reducing the capacity of the system to move the heated out of the vehicle cabin.

Such ventilating systems furthermore increase the manufacturing cost of the vehicle to the consumer because the design of the normal ventilating ducts may have to be altered to include the auxiliary feature. Since the operating parts of ventilating systems are physically interdependent on one another, problems arising in the system providing heat and air conditioning may in turn effect the proper functioning of the parked ventilating feature. Conversely, problems developing in the system providing ventilation when the vehicle is parked may alternatively effect the functioning of the normal ventilating system.

Accordingly, an object of the present invention is to provide a ventilator functioning separately of the vehicle standard ventilation system which may be readily installed in the pre-existing structure of the vehicle or used as a portable device to ventilate the cabin of a parked vehicle while simultaneously preserving the integrity of vehicle cabin from undesired entry.

Another object of the present invention is to provide a self-contained ventilator usable independently having an independently supplied power source such that the ventilator is independent of the vehicle systems.

Another object of the present invention is to provide a ventilator which may be readily installed into the pre-existing structure of a vehicle without affecting significant changes to the vehicle structural design.

Yet a further object of the present invention is to provide a low cost ventilator usable in a vehicle when parked to remove air otherwise entrapped within the vehicle cabin and draw fresh cooler air from the outside environment.

Another object of the present invention is to provide a ventilator so configured as to enable exchange of air between vehicle cabin and the external environment while simultaneously prohibiting rain or other precipitants from entering the cabin through the ventilator.

SUMMARY OF THE INVENTION

The invention resides in a ventilator usable as a portable device fixable to a motor vehicle or readily installed in the pre-existing structure of the vehicle and comprises a ventilator housing supported on the vehicle structure and a powered impeller for positively moving air through the housing and having a power supply source for driving the impeller and damper means for controlling the flow of air through the housing. The housing has first and second openings positioned in a spatial relationship with one another thereby preventing rain or other precipitants from entering into the vehicle cabin through the openings formed in the housing. The damper means is carried by the housing and may be operated from within the vehicle cabin.

The invention also resides in a system utilizing the aforementioned ventilator in combination with a static ventilator each of which ventilators may be positioned along opposite sides of the vehicle to create a cross-flow within the vehicle cabin interior.

The invention further resides in a self-contained ventilator insert panel for portably positioning a ventilator within a partially opened space of in a frame of the vehicle. The insert has adjustment means for adjustably securing the insert against lateral displacement once the insert is positioned within the opening in the frame.

BRIEF DESCRIPTION OF THE DRAWINGS

FIG. 1A is a perspective view of a vehicle showing the ventilator embodying the present invention secured within a rear side window of the vehicle.

FIG. 1B is a perspective view of a vehicle showing the ventilator embodying the present invention secured to the pre-existing rear panel of the vehicle.

FIG. 3 illustrates the ventilator housing disclosed in FIGS. 2A-2C employing the powered impeller shown in FIG. 9.

FIG. 4 is a vertical cross sectional view taken through a second embodiment of the ventilator.

FIG. 5A is a vertical sectional view taken through the vehicle support and shows an outside elevation view of a third embodiment of a ventilator defining the present invention formed from sheet metal.

FIG. 5B is a front elevation view of the ventilator shown in FIG. 5A.

FIG. 8 shows a front elevation view of the mounting plate for securing the powered impeller with the assembled housing.

FIG. 9 is a perspective view of the powered impeller usable in the ventilator of the present invention.

FIG. 10 is a schematic view of the circuitry which may be employed to drive the powered impellers illustrated in FIGS. 9 and 17.

FIG. 11 is a fragmentary side elevation view of another embodiment of the invention showing a ventilator mounted on window insert for placement in a partially open window of a vehicle.

FIG. 12A is a sectional view taken along line 12A—12A in FIG. 11 showing the adjustment feature of the insert.

FIG. 12B is a fragmentary side elevation view taken along line 12B—12B in FIG. 12A.

FIG. 13 is a vertical sectional view taken along line 13—13 in FIG. 11.

FIGS. 14A and 14B illustrate a plug for replacing the removed portion of the existing vehicle window or panel structure when the ventilator is removed.

FIG. 28 is a sectional view through FIG. 27 taken along lines 28—28 showing the insert in combination with the sunroof laid on top of it.

FIG. 29a is a partially fragmentary side view of a clip mechanism used to secure the insert to the vehicle structure.

FIG. 29b is an elevational view of the top mounting clip of FIG. 29a.

FIG. 29c is a front elevational view of the bottom mounting clip of FIG. 29a.

DETAILED DESCRIPTION OF THE DRAWINGS

Figure 2C:
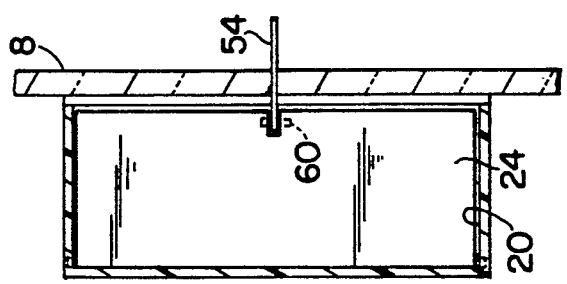
FIG. 2C is a view taken along line 2C—2C in FIG. 2A showing the damper in its closed position.

Turning now to the drawings, the ventilator embodying the present invention is shown generally as element 2 mounted on a rear window of a vehicle 1 as illustrated in FIG. 1A or, alternatively mounted to the vehicle rear panel as is illustrated in FIG. 1B.

FIGS. 2A, 2B, 2C and FIG. 3 show a first embodiment of the ventilator fixed to a support surface 8 which may be the window support the shown in FIG. 1A or may be the panel support of FIG. 1B. Ventilator 2 is generally comprised of a two-piece housing consisting generally of a housing outer part 4 and a housing inner part 6. The housing outer part 4 has a radially directed outer flange 10 extending partially about its circumference. The flange 10 has an intermediate step portion 14 directed inwardly of the flange 10 such that another annularly extending flange 12 is carried by the step portion 14 and is oriented parallel with the flange 10. The annular flange 12 defines a first opening into which air may pass freely into or out the housing part 4. The outer diameter of the intermediate connecting portion 14 measured perpendicularly to the indicated axis A, is slightly smaller than that of an opening 22 formed in the support 8 so as to be capable of being closely fit into opening 22 such that the intermediate portion 14 and the flange 12 are received within the opening 22 while flange 10 abuts against the outer surface of the support 8. The length of intermediate portion 14 extending between the flanges 10 and 12 is sized such that the inner surface of flange 12 oriented toward the vehicle interior is substantially flush with the opposite surface of the support 8.

The housing 4 is comprised of a generally curvilinear upper section 18 and a generally straight side wall section 16 connected continuously with the curved upper section 18. At the lower end of the straight side wall section 16 of the housing 4 is formed an opening 20 which preferably has a rectangular cross sectional configuration. As is shown in FIG. 2C, located adjacent the opening 20 in the in straight side wall section of the housing 4 is a movable damper 24 pivotally connected to the opposed side walls of the housing section 16 through pivot pins 26. A stop 30 prevents the damper 24 from swinging through an arc greater than 90 degrees from its fully open position shown parallel with the side wall portion 16.

The means used for selectively opening and closing the damper 24 includes a stiffened wire element 54 having at one end a curled portion comprising an eyelet 59 and, at its opposite other end a flat head 56. The wire 54 communicates between the vehicle interior and exterior through an angled opening 58. As shown in FIG. 2C, the eyelet 59 surrounds a pin 60 embedded within material of the damper 24 such that the eyelet end of the wire 54 pivots about the pin 60. Movement of the head 56 toward and away from the support 8 consequently moves the free end of the damper 24 between its open and its closed position. The damper 24 is held in the upright open position when the head 56 is pushed toward the support 8 and abuts collar 62 affixed to the inner surface of the support 8. The collar 62 may be formed of magnetic material and the head 56 formed from a metallic material such that when the head 56 contacts with the collar 62 it is held at that position by magnetic force generated contact by the collar 62. However, it should be appreciated that the attracting force of the collar 62 is only slightly sufficient enough to hold the damper in its upright position and is easily overcome by fingertip pressure pulling the head 56 away from the collar 62 when closing of the damper 24 is desired. Conversely, the weight of the damper 24 along with that of the head 56 is sufficient to hold the damper in its closed position abutting the stop 30 as shown in phantom line in FIG. 2A to sufficiently block air passage into the ventilator 2.

Figure 2B:
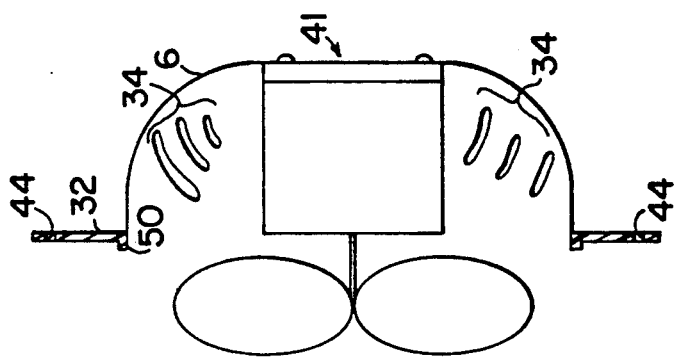
FIG. 2B shows in vertical cross-section the inner housing part of the ventilator shown separately of the outer housing part.
Figure 2A:
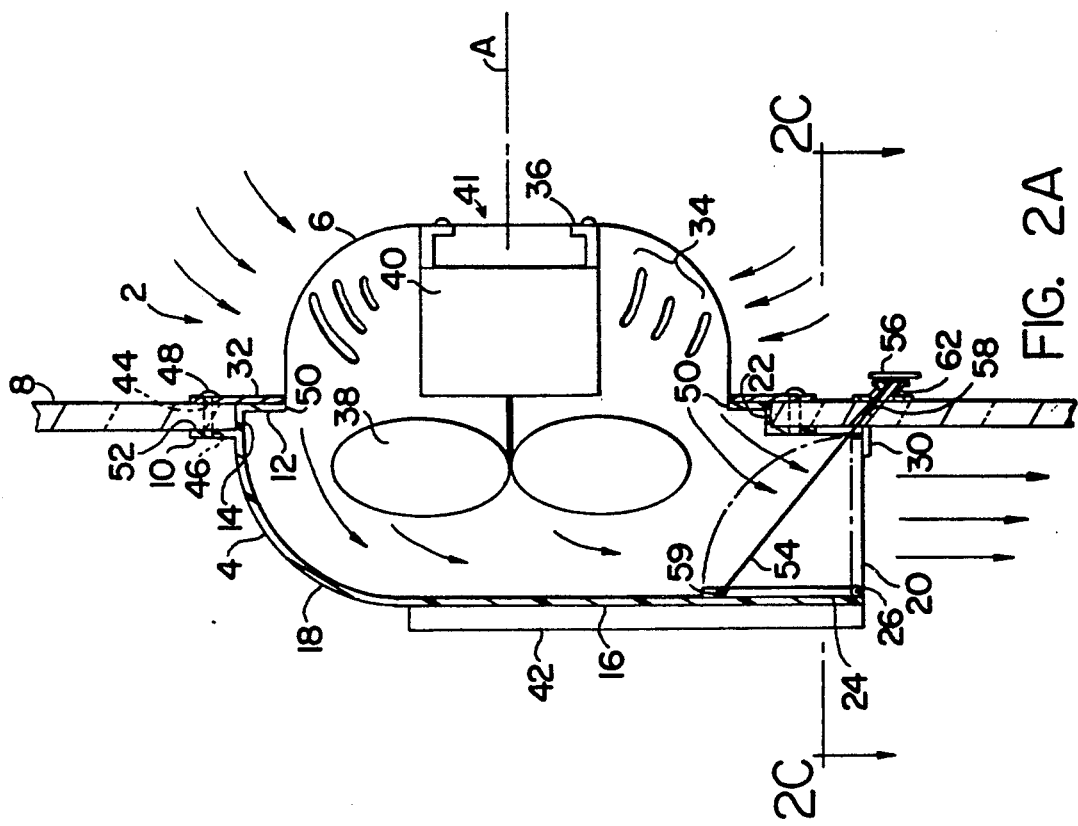
FIG. 2A shows a vertical cross sectional view taken through a first embodiment of the ventilator embodying the present invention.

As is shown in FIG. 2B the inner housing part 6 is a generally hat-shaped element having an annular flange 32 extending about the periphery of the base area of the part 6 with the remaining portion of the inner housing part 6 being generally cup-shaped. The inner housing part 6 has formed along its circumference thereof a lip portion 50 which extends outwardly and perpendicularly of the flange 32 and is received within the opening defined by the annular flange 12 so as to place the inner housing part 6 concentrically with the first opening defined by the flange 12. The lip 50 aids in the centering of the housing part 6 during assembly as will become apparent later.

Passages 34 are formed in the cup-shaped portion of the inner housing part 6 to allow air to flow from outside of the housing part 6 inwardly into the ventilator. A powered impeller 41 is fixed to the housing inner part 6 by a bracket 36 and includes blades 38 spatially arranged about the central axis A coincident with the center of the circular opening 22 and are preferably driven by an electric motor 40 which may be powered by a panel of photovoltaic cells 42 carried on the outer surface of the side wall section 16 of the outer housing part 4. The powered impeller 41 being fixable to the inner housing part 6 by screws or other suitable attachment devices may, as a result, be preassembled as a unit prior to the joining of the inner housing part 6 with the outer housing part 4. The inner part 6 and the outer part 4 are preferably connected together with one another by threaded fasteners 48 which cooperate with preformed openings 44 and 46 oriented at selected positions respectively about the circumferences of flanges 32 and 10 and formed through the support 8.

In assembling the ventilator 2 within the preformed opening 22 in a support 8, the outer housing part 4 is positioned in the opening 22 from the exterior environment such that the flange 10 abuts the outer surface of the support 8. Subsequently, the inner housing part 6 is placed in registry with the flange 12 of the outer housing part 4 with the aid of the lip portion 50 such that the corresponding openings 44 and 46 in each of the flanges 32 and 10 respectively align with one another. Once the openings 44 and 46 are aligned, the threaded fasteners 48 are inserted into the openings 44 and 46 to thereby clamp the support 8 between the inner housing part 6 and outer housing part 4. To prevent moisture from entering through the opening 22, an annular gasket 52 or other water impervious material is place between the housing part 4 and the support 8 prior to the assembly procedure. In the embodiment shown in FIGS. 2A, 2B and 2C, the housing parts 4 and 6, and the damper 24 may be formed from a molded plastic material such as polyurethane or the like. It should be appreciated from the general shape of the ventilator shown in FIG. 2A that the upper curvilinear section 18 of the housing 4 shields the interior of the vehicle cabin from precipitation, such as snow, rain, or hail while the discharge opening 20, being disposed below the opening 22 in the support 8, effectively inhibits passage of such elements up through the sidewall portion 16 when the damper 24 is in its open or partially open position.

As shown in FIG. 3, the compact feature of the ventilator embodying the present invention enables a powered impeller 41 of the type having a square housing rotatably supporting impeller blades to be mounted within the housing part 6 of the ventilator shown in FIG. 2 such that air is drawn through the impeller housing in line with the general contour of the ventilator. The powered impeller 41 is one such as described later in reference to FIG. 9 and has a substantially square housing with four spaced apart through openings positioned about the housing periphery such that each of the openings is in alignment with a mounting support 43 formed integrally on the inner surface of the inner housing part 6. The mounting supports 43 each have threaded openings formed therein and receive the correspondingly threaded ends of elongated screws 47 communicating through the openings formed in the impeller housing.

Referring now to FIG. 4, another embodiment of the invention shown generally as 2' is disclosed and illustrates a variance of the housing structure suitable for mounting within the cabin of a vehicle rather than being exposed externally of the vehicle. As previously discussed, the support 8 can either be a window of the vehicle 1 or a vehicle rear panel as illustrated alternatively in FIGS. 1A and 1B. The ventilator 2' has an inner housing part 4' and an outer housing part 6'. The outer part 6' is generally defined by an annularly extending flange 10' with outwardly directed fins 13 forming the interior portion of the housing part 6'. The fins 13 are joined with the annular flange portion 10' of the outer housing part 6' at each fin end such as to be fixedly supported in the angular orientation shown in FIG. 4. The inner housing part 4' comprises a curvilinear section 18' and a straight side wall section 16' joining with the section 18' to form a continuous surface along the housing 4'. A dividing wall 15 extends parallel with an opposed outer wall of the side wall section and serves to create a tunnel within the housing 4'. The motor 40 is receivable within a cut out formed in the wall 15 such that the outside surface of the motor 40 is continuous with the outwardly facing surface of the wall 15 to create a generally uninterrupted surface thereby producing less drag to air passage.

The inner housing part 4' carries about a portion of its periphery adjacent the curvilinear section 18' a flange 32' which extends substantially radially about the portion 18'. The flange 32' has a first rim portion 50' extending generally perpendicularly of the flange 32' such that it extends into the opening 22 by dimension equal to the thickness of the support 8. An annularly extending outer flange 33 is carried by a perpendicularly oriented second rim portion 14' extending inwardly of the side wall section 16' by a dimension equal to the thickness of the support element 8 such that the outer flange 33 is stepped relative to the adjacent side wall section 16'. Threaded fasteners 48' or the like are placed within correspondingly aligned holes formed respectively in each of the flanges 10', 33 and 32' such that the support 8 is clamped between the outer housing part 6' and the inner housing part 4'.

A damper 24' may be employed and may be selectively moved between open and closed positions using a stiffen wire 54' as discussed previously in FIG. 2C. The inner housing part 4' and the outer housing part 6' are preferably formed from molded plastic. It should be appreciated from the general structure of the ventilator 2', that rain or other precipitants are inhibited from travelling upwardly of the opening 22 because the fins 13 are directed downwardly to shed rain other particulates away. Those precipitants which may enter through openings between the fins 13 collect within the curvilinear portion 18' of the housing part 4' and cannot advance upwardly.

Referring now to FIGS. 5-8 a third embodiment of a ventilator is shown mounted to the support 8 of a vehicle. The ventilator is shown generally as element 2" and is comprised of a housing part 62 having side walls 68 and 70, a main wall portion 72 and an upper angled portion 74 extending from the main portion 72. As such, the housing part 62 has a generally open back face which becomes enclosed when the housing part 62 is attached to a back plate 64. The back plate 64 and the housing part 62 may be joined by commonly known means such as by welding or by employing a suitable adhesive, such as epoxy. The back plate 64 has an opening 66 coaxially aligned with opening 22 formed in the support 8 such that the chamber 76 formed by the housing part 62 and the back plate 64 communicates with the interior of the vehicle cabin.

Figure 7A:
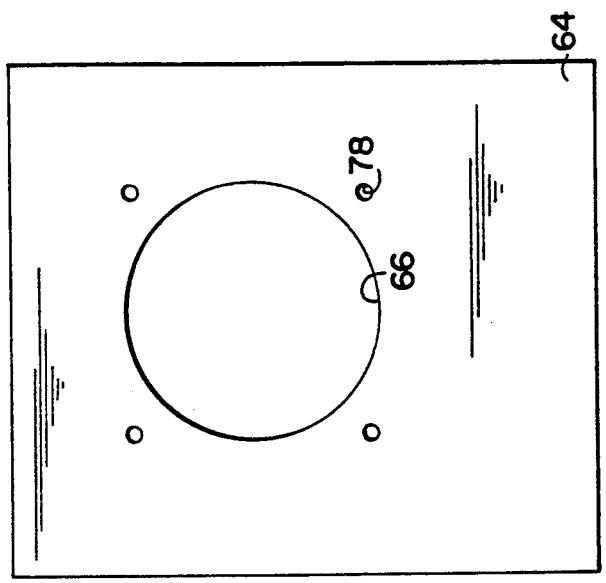
FIG. 7A is a front elevation view showing the housing back plate.
Figure 7B:
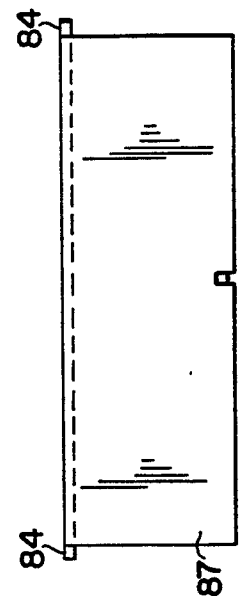
FIG. 7B shows the damper prior to being assembled with the covering shown in FIG. 6.
Figure 6:
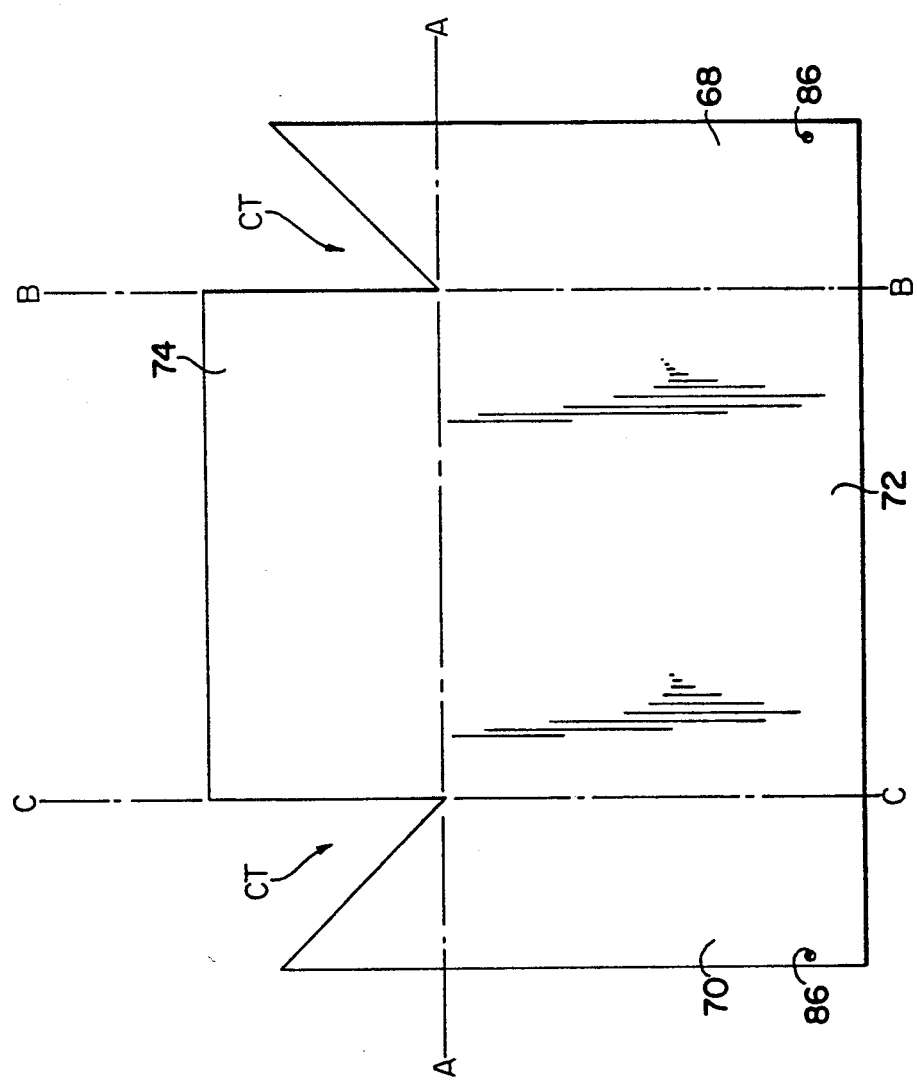
FIG. 6 is a top plan view of the housing cover section of the ventilator shown in FIG. 5 prior to being assembled as the ventilator housing.

As is shown in FIG. 6, the housing part 62 is formed from a single flat sheet of metal cut so as to form the angled indentations CT allowing the upper portion 74 to be bent along line AA and allowing the side walls 68 and 70 to be formed by bending the respective sections of the sheet of metal around lines BB and CC. The edges of the walls 68 and 70 which confront the upper portion 74 after the part 62 has been formed by bending are preferably joined by welding along each confronting edge or by applying adhesive to the surfaces to be joined. The bending operation also permits a damper 82 to be fixed within the housing part 62 during the bending operation. As is shown in FIGS. 7A and 7B; the width dimension of the damper 82 is slightly less than of the width of the back plate 64 and the damper 82 carries pins 84 which extend beyond this width. Since the pins 84 extend beyond the damper width, openings 86 formed in sheet of metal may be moved into engagement with the pins 84 thereby journalling the same within the housing part 62 during the forming process.

As in shown in FIG. 7A, the back plate 64 has threaded openings 78 formed circumferentially about the opening 66. The threaded openings 78 receive fasteners passing through the frame of powered impeller 41. A mounting plate shown in FIG. 8 as element 80 supports a powered impeller and has a through opening 81 and perforations 83 arranged about its periphery such that the perforations 83 are in alignment with the threaded openings 78 formed in the back plate 64 when the ventilator 2" is assembled. The powered impeller 41 is one such as shown in FIG. 9 having a support housing integrally formed as part of the electric motor, which housing also includes through openings formed about its periphery for receiving the fasteners connecting the back plate with the mounting plate 80.

Referring now to FIG. 9, the powered ventilator illustrated as element 41 is preferably a commonly known brushless DC electric fan of the type, for example made by EMB INDUSTRIES, model no. W2G107, having an aluminum housing and impeller blades 38 formed correspondingly from aluminum. The housing has a substantially square configuration has a uniform length dimension L of approximately 4½ inches while having width dimension W equal to approximately 1½ inches thereby enabling the fan 41 to be readily installed within the relatively confined space of the ventilator housing 2 or 2'.

The fan 41 may be energized and driven by a power pack consisting of eight 1½ volt pen light rechargeable batteries arranged in series with one another to drive the D.C. electric motor rotating the impellers 38. As is shown in FIG. 10, the power supply source indicated as numeral 88 drives the powered impeller 41 when a switch 93 is selectively activated to complete the circuit. In order to prevent the power source 88 from becoming depleted, a panel of photovoltaic cells 42 may be connected in parallel with the voltage source supply 88 to provide electric energy to the source 88 during use or non-used depending on whether adequate brightness is provided to the panel 42. The panel 42 may be one of a number of such commercially available types of panels and may, if desired, be one manufactured by ARCO Solar, model no. G50. In addition, the power source 88 may be a battery pack capable of being connected to the vehicle's electrical system so that the ventilator is provided with a rechargeable energy source during the normal running of the vehicle. One such type of battery pack is commercially available from Radio Shack, model no. 23-139. It should be appreciated that in certain circumstances, it may be desirable to simply connect the photovoltaic panel 42 directly with the motor 40 without using a battery pack 88.

Referring now to FIGS. 11-13, a ventilator window insert panel 92 employing the ventilator of the type previous discussed is placed into the frame of the vehicle 1 for portable mounting of the ventilator panel 92 in the space provided by a partially open window 90 of a vehicle. As is shown in FIG. 11, the window 90 is moveable between upper and lower positions and an intermediate position 90' shown in dotted line. The insert panel 92 at its top end is shaped so as to conform to the contour of the vehicle frame receiving the window in its normally closed position. The panel 92 is thus preferably formed from an easily cuttable and transparent material, such as Plexiglas. At the bottom end of the insert panel 92 is formed a longitudinally extending flange in the form of an inverted U-shaped channel for receiving the top edge of the window 90.

As is shown in FIGS. 12A and 12B, it is a feature of this embodiment to provide means by which the insert panel 92 becomes rigidly fixed within the space provided by a partially open window in a vehicle. To do this, the insert panel 92 is comprised of a generally planar main part 96 and a second or auxiliary generally planar part 98 slidable relative to the main part 96. The main part 96 employs a laterally offset portion 100 which is formed integrally with the remaining portion of the main part 96 such that a connecting portion 102 orients the offset portion 100 in a parallel relationship with the remaining portion of the main part 96.

As is shown in FIG. 12A, part of the car frame 91 surrounding the window space has a channel for receiving one lateral side of the window 90 as it is raised upwardly from its lowermost position. Since the offset portion 100 is spaced laterally of the main part 96 by approximately the thickness of the insert panel, the second part 98 is therefore oriented in a plane substantially coincident with the plane including the main part 96 such that the second part 98 is capable of being received within the channel of the frame 91. Formed in the second part 98 are horizontally deposed slots 104 which receive correspondingly sized screws 106 extending inwardly of the offset portion 100 toward the second part 98 and secured within the main part 96 by adhesive means. Each screw 106 cooperates with an associated wingnut 108 and a washer 110 to fixably secure the second part 98 relative to the offset portion 100 of the main part 96.

In securing the insert 92 within the frame 91 of the vehicle, the window 90 is first lowered to a position providing sufficient clearance between the lower edge of the flange 94 and the upper leading edges of the insert parts 96 and 98. Once the upper leading edge of the parts 96 and 98 are received within the channel formed in the frame part 91' shown in FIG. 13, the flange 94 is then positioned just above the leading edge of the window 90 so that upon raising of the window 90, it is received within the inverted shaped channel of the flange 94.

In order to finally secure the insert 92 within the partially open space, the insert main part 96 is first forced backwardly into the rear channel of the frame 91 thus insuring that the main part 96 is properly secured against rearward movement. Forward adjustment of the panel insert 92 is then accomplished by loosening the wingnuts 108 and subsequently sliding the second part 98 into the adjacent channel of the vehicle frame 91 and thereafter tightening the wingnuts 108 to clamp the offset portion 100 with the second portion 98 with one another to thereby create a rigid and unitary element. It should be appreciated therefore that the insert 92 is a device which can be mounted almost instantaneously to the vehicle frame when the operator of the vehicle is preparing to leave the vehicle parked for a given period of time. The ventilator 2 is preferably mounted on the main part 96 along with a panel of photovoltaic cells 42 which may be attached to the main part 96 by suitable fixing means, such as adhesive or suction cups. Since the insert 92 carries the panel of photovoltaic cells 42 connected with the ventilator 2, it is a self-contained unit providing both a power source and an adjustment means so as to enable the operator to readily mount the device in a frame of the vehicle without tending to extensive assembly procedures and wire connections.

In carrying out the invention, a user may wish to dismantle the ventilator from either the vehicle window or the panel structure on which it is mounted. Since such dismantling would leave the opening 22 exposed, a two piece plug shown in FIGS. 14A and 14B as element 99 may be introduced into the opening 22 and subsequently prevented from removal by connecting one plug piece with the other using fasteners 97.

Figure 15:
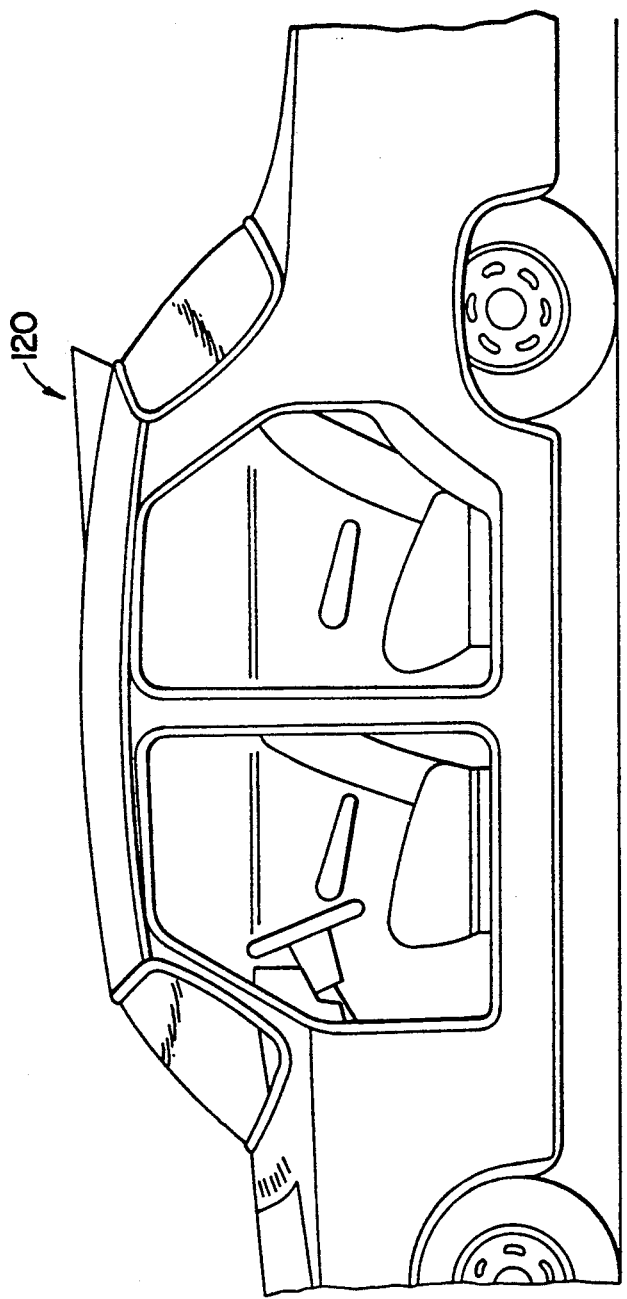
FIG. 15 is a side elevation view of a motor vehicle employing a further variation of the ventilator embodying the present invention shown as a roof mounted scoop-type ventilator.

In accordance with a further aspect of the invention, a scoop-type ventilator illustrated generally as 120 in FIG. 15 is shown mounted to the roof structure of a vehicle. The ventilator 120 has in side view a general wedge shape such that the top surface remains substantially parallel with the horizontal surface of the vehicle roof thereby enabling the ventilator to blend with the generally streamline contour of the vehicle roof so as to produce little if any additional drag when the vehicle is moving.

Figure 16B:
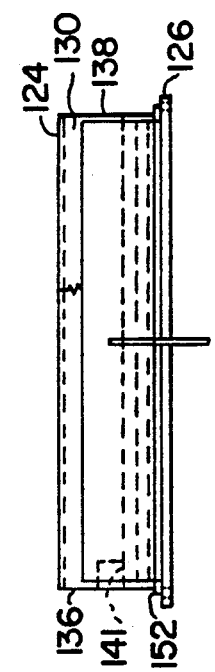
FIG. 16B is an end view taken along line 15B—15B in FIG. 16A.
Figure 16A:
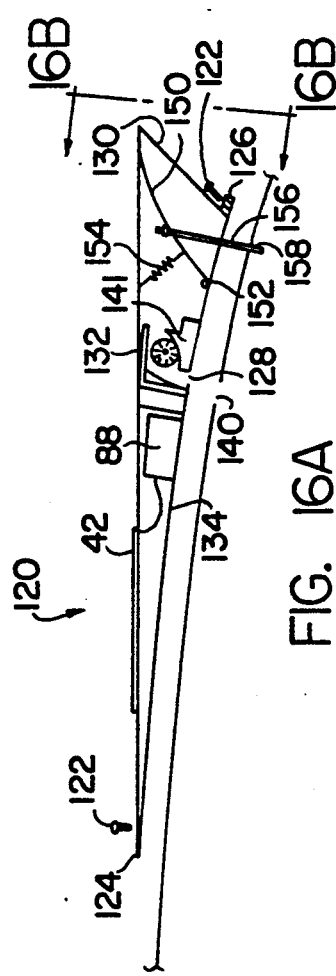
FIG. 16A illustrates a roof mounted scoop-type ventilator of the type shown in FIG. 14 and shows the ventilator in a vertical cross sectional view separately of the vehicle before it is mounted to it.

As shown in FIGS. 16A and 16B, the scoop-type ventilator 120 is preferably formed as a separate element which may be attached to the vehicle structure subsequent to its manufacture. The ventilator 120 has a substantially planar upper cover member 132 defining a surface extending generally parallel to a horizontal plane and having a slightly arched lower member 134 each interconnecting sidewalls 136 and 138 such that the side walls 136 and 138 increase in height proceeding away from a leading edge flange 124 and terminating adjacent a rear edge flange 126. The sidewalls 136 and 138, and the upper and lower members 132 and 134 of the ventilator form an opening 130 adjacent the flange 126 which opening has a substantially rectangular cross-section as shown in FIG. 16B;

A second opening 128 is formed transversely across the lower member 134 and communicates with a correspondingly sized end shaped opening 140 cut into the roof of the vehicle prior to assembling the ventilator 120 with the vehicle structure. Positioned directly above the opening 128 formed in the lower member 134, is a cross-flow blower fan 141 of the type shown in FIG. 19 fixed to the structure of the ventilator 120 and communicates between the openings 128 and 130 to move air between the vehicle interior cabin and the external environment. The fan 141 is preferably powered by the aforementioned voltage source supply 88 in the form of a battery pack with a supplemental power supply being provided by panel of photovoltaic cells 42 of the type previously discussed when referenced to FIG. 10. Also, the ventilator 120 may be fixed to the roof surface by suitable attachment means such as by sheet metal screws 122 inserted within openings in the flanges 124 and 126 of the ventilator 120.

Air flow through the scoop-type ventilator 120 may be regulated by a pivotal damper 150 positioned for rotation adjacent the base member 134 about pivot pins 152 extending laterally of the damper 150 and into the sidewalls 136 and 138. The damper 150 is biased in a closed position by a spring 154 such that the lower surface of the cover member 132 acts as a stop and blocks the opening 130 in the illustrated closed position. An adjusting rod 156 having a threaded upper end and a lower end capable of being rotated from the vehicle interior is received within an opening 158 formed in the roof of the vehicle 1 and threadably engages with the damper 150 to selectively move it between open and closed positions when it is rotated.

Figure 16D:
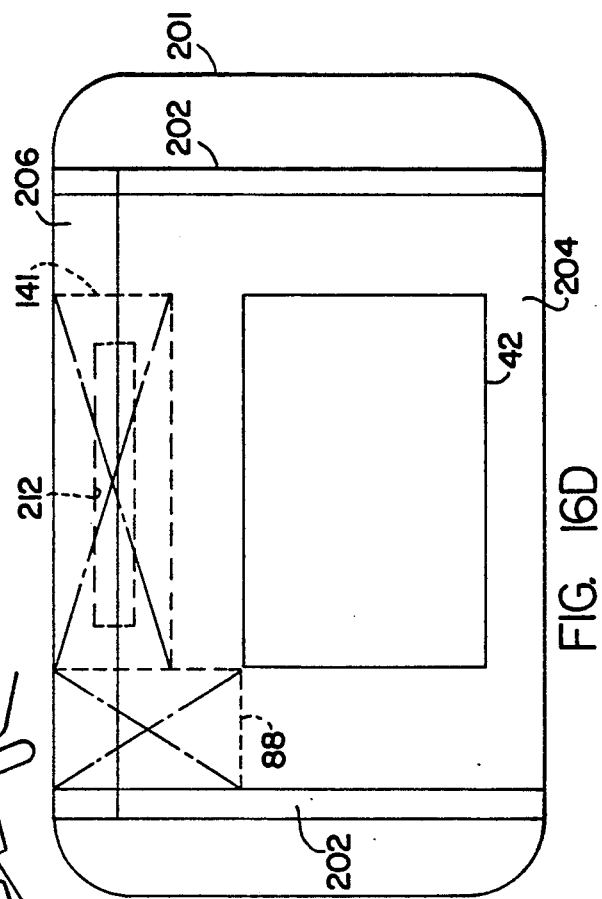
FIG. 16D is a top plan view of the ventilator shown in FIG. 16B.
Figure 16E:
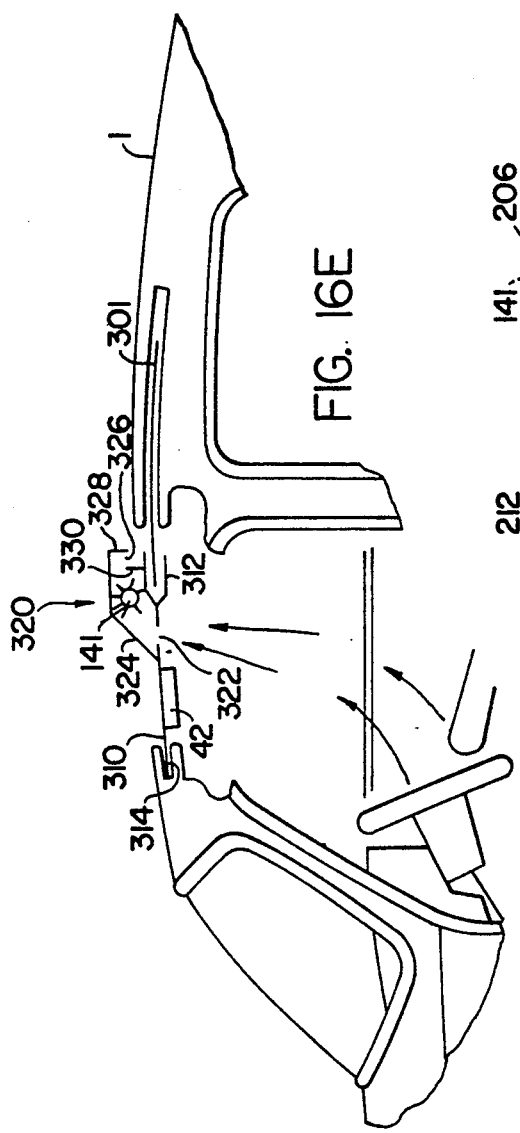
FIG. 16E is a fragmentary view of a motor vehicle having a sliding sun roof and showing in vertical sectional view of a roof mounted ventilator insert capable of being secured within a partially opened sun roof.
Figure 16C:
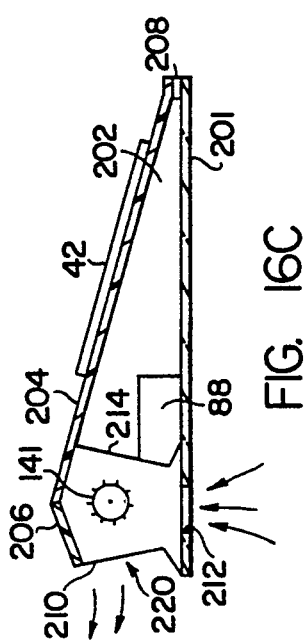
FIG. 16C is a vertical sectional view through another embodiment of a roof mounted ventilator shown fixed to a pop-out sunroof panel.

Referring now to FIGS. 16C and 16D, a second type of roof mounted ventilator shown generally as 220 is fixed to a pop-out sunroof panel 201. The sunroof panel 201 supports wedge-shaped sidewalls 202 laterally spaced apart from one another defining the general width of the ventilator. The sidewalls 202 in turn support the cover members 204 and 206 such that the cover member 204 is inclined at an angle relative to leading edge 208 of the ventilator 220. Opposite the leading edge 208 is an opening 210 defined generally by the pop-out roof panel 201, the sidewalls 202 and the cover member 206. A second opening 212 is formed in the pop-out roof panel 201 and extends laterally of the panel 201 at right angles to each of the sidewalls 202. Positioned adjacent the opening 212 is a cross-flow fan 141 similar to that shown in FIG. 19 for moving air between the vehicle cabin interior and the outside external environment. In order to direct air out of the ventilator 220 through the opening 210, a partition wall 214 is placed adjacent the fan 141 so as to direct air flow outwardly of the ventilator through the opening 210. The partition 214 also provides a sealed compartment in which a voltage power source, such as battery pack 88, may be housed. The battery pack 88 in turn may be used in conjunction with a panel of photovoltaic cells 42 mounted on the cover member 204 to provide a supplemental recharging energy source for the power pack 88. The sidewalls 202 and cover members 204 and 206 are each preferably formed from a plastic material, such as Plexiglas, and are connected with one another and to the pop-out panel 201 using commonly known bonding means, such as commercially available acrylic adhesive.

Figure 16F:
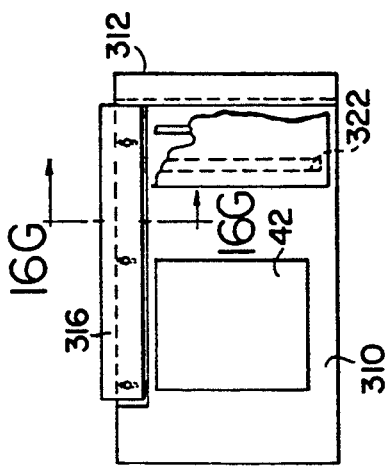
FIG. 16F is a top fragmentary view of the roof mounted ventilator insert shown in FIG. 16E.
Figure 16G:
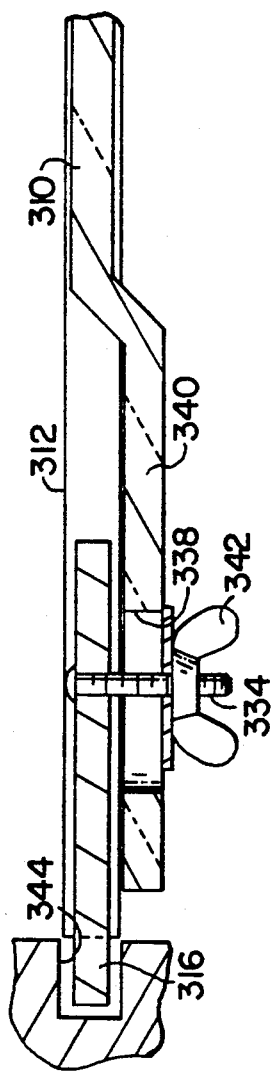
FIG. 16G is a sectional view taken along line 16G—16G in FIG. 16F.

In keeping with the invention, FIGS. 16E, 16F and 16G illustrate a third alternative embodiment of the roof-mounted ventilator. The roof-mounted ventilator shown generally as an insert element 320 is adapted for use with a slidable sunroof top such that the ventilator 320 may be positioned within a partially opened space in the roof frame when the sunroof 301 is partially retracted. The ventilator insert 320 is comprised of a first planar main panel part 310 and a second or auxiliary panel part 316 slidably supported on the main panel part 310. The main panel part 310 has a thickness slightly smaller than the dimension of a receiving channel 314 formed in the roof frame of the vehicle 1 into which the leading edge of the main part 310 is received. At the opposite trailing edge of the ventilator insert 320 is formed a generally U-shaped channel 312 sized and shaped to receive the leading edge of the sliding sunroof panel 301.

A transversely extending opening 322 is formed in the main panel part 310 and is covered by a ventilator housing 324 having an opening 326 such that air may communicate between the internal cabin environment and the external outer environment via the openings 322 and 326. As is shown in FIG. 16E, the opening 326 is defined by a flange 328 depending from the housing 320 and an abutment wall 330 extending upwardly from the trailing section of the insert 320 such that air flowing through the ventilator 320 passes between the space defined by the opposed surfaces of members 328 and 330. By orienting the elements 328 and 330 in such a manner, rain or other unwanted elements are substantially restricted from entering into the ventilator 320 through the opening 326. The ventilator insert 320 also empolys a cross-flow ventilator 141 similar to that shown in FIG. 19 for positive movement of air between the separated environments. The panel 310 is preferably formed from a transparent material, such as for example Plexiglas, so that the fan 141 may be powered by a photovoltaic panel 42 fixed to the undersurface of the first panel part 310.

It is a feature of this embodiment to provide means by which the roof-mounted ventilator insert parts 310 and 316 become rigidly laterally fixed within the space provided by the partially opened sunroof panel 310. To do this, the insert 320 employs downwardly depending screws 334 fixed within openings formed in the second panel part 316 and cooperate within slots 338 formed in an offset portion 340 of the first panel part 310 as is shown in detail in FIG. 16G and as previously discussed with reference to FIGS. 11, 12 and 13. Thus, the ventilator insert 320 may be securely fixed within the partially open space of a sunroof by first retracting the sunroof panel 301 in order to place the entire insert within the opening and then advancing the slidable panel 301 toward the channel 312 in order to place leading edge of the first panel part 310 in registry with the channel 314 formed on the roof frame of the vehicle 1. Lateral movement of the ventilator insert 320 is then arrested by loosening the wing nuts 342 carried by the screws 334 and moving the leading lateral edge of the second panel part 316 into registry with a side channel 344 formed in the roof structure of the vehicle 1 and subsequently re-tightening the nuts.

Figure 17:
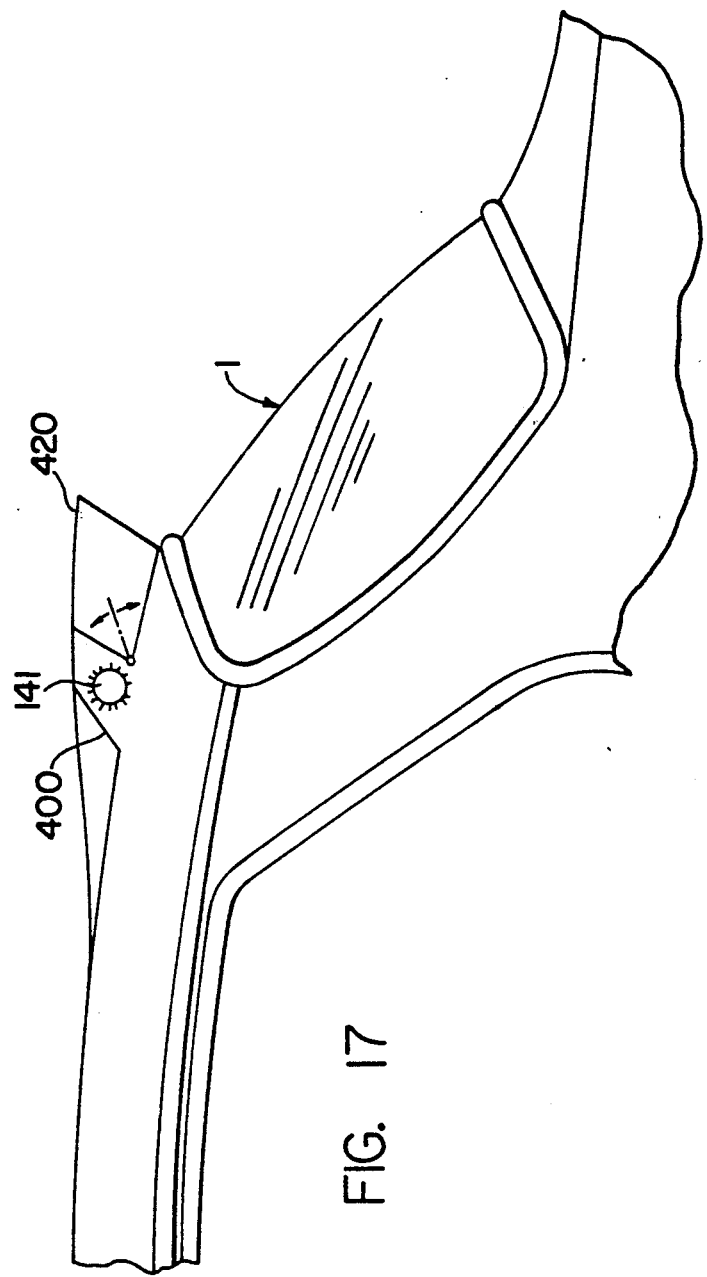
FIG. 17 is a fragmentary side elevation view of a vehicle having the scoop-type ventilator integrally formed as part of the roof structure and illustrates the roll-type powered impeller of FIG. 19 usable with the scoop-type ventilator.
Figure 18:
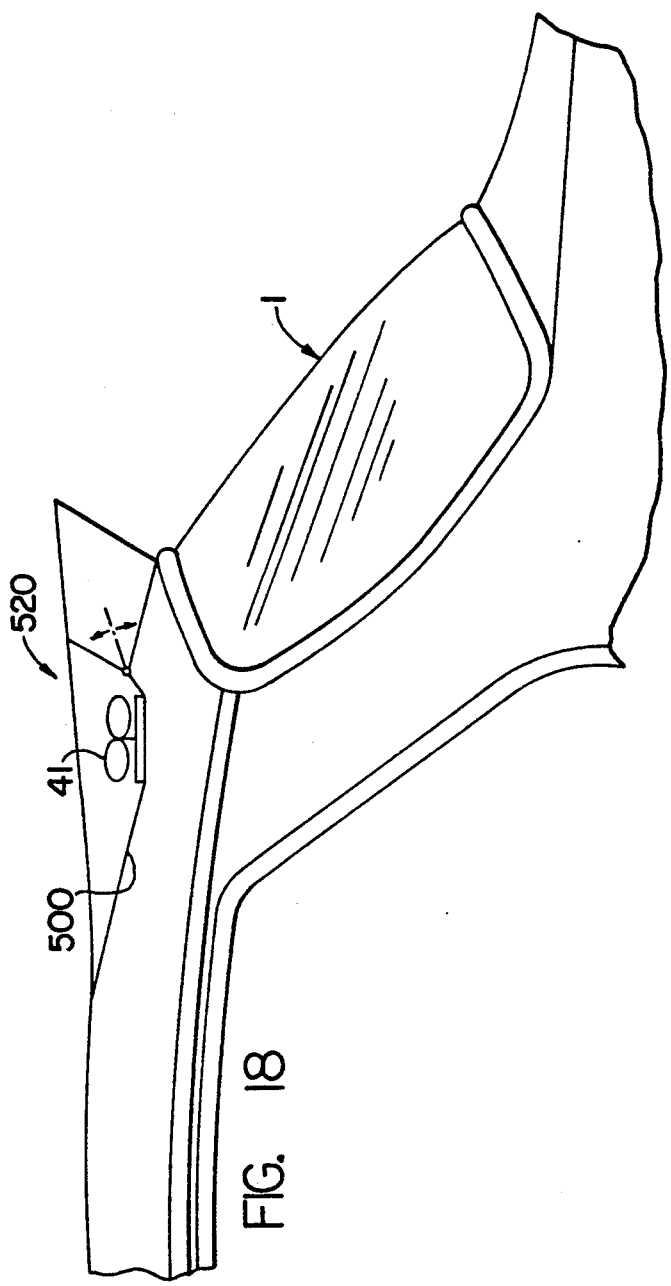
FIGS. 18 is a fragmentary side elevation view of a vehicle having a scoop-type ventilator integrally formed with the vehicle roof structure and illustrates the rotary-type fan of FIG. 9 usable able with the scoop-type ventilator.

While the scoop-type ventilators shown thus far have been illustrated as separate elements attachable to the vehicle structure subsequent to manufacturing of the vehicle, it should be appreciated that such scoop-type ventilators alternatively may be manufactured as an integral part of the roof structure. As is shown in FIG. 17, the roof structure includes upwardly extending wings 400 for supporting the generally wedge-shaped housing of the scoop ventilator 420 and a cross-flow blower 141 similar to that discussed in reference to FIG. 19. Alternatively, as shown in FIG. 18, the roof structure of the vehicle 1 may have a well 500 for receiving a powered impeller 41 such as described with reference to FIG. 9. The scoop-type ventilator 520 has a housing integrally formed with the roof of the vehicle 1 such that the well 500 is covered and maintains the streamlined contour of the vehicle.

Figure 19:
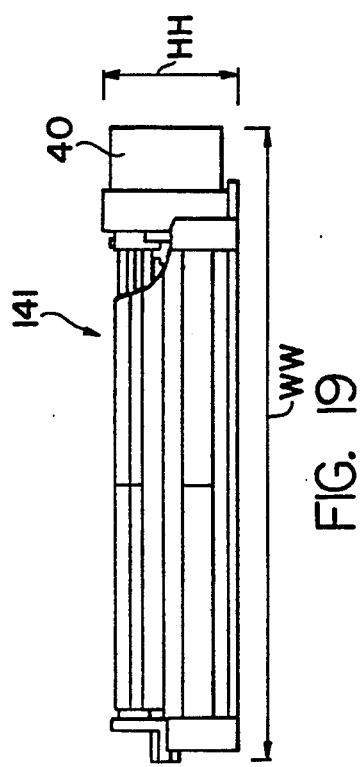
FIG. 19 is a front elevation view of a cross-flow ventilator usable in the ventilators of the present invention.

FIG. 19 illustrates in detail the cross-flow ventilator 141 employed in the various roof-mounted ventilator embodiments. The cross-flow blower illustrated uses a roll-type powered impeller commercially available and manufactured by for example EMB Industries under Model No. 22G0303-AA. The cross-flow blower shown in FIG. 19 measures approximately 8" along the dimension indicated as WW and approximately 2" along the dimension indicated as HH. Thus, it should be appreciated that the scoop-type ventilators of the present invention need not have a width or a height much greater than the given dimensions WW and HH respectively, thereby allowing the scoop-type ventilator to be streamlined. Also, the blower shown in FIG. 19 employs a brushless DC electric motor further improving the efficiency of the blower to move air.

It is a further feature of the present invention to provide a system having both a ventilator of the type previously discussed wherein a powered impeller means is used to positively move air between environments as well as providing a static ventilator usable in combination with one of the aforementioned ventilator types for exhausting or in-taking air as it is moved by the ventilator employing the powered impeller means. It being preferable to position each of these types of ventilators on opposite sides of the vehicle, air is thus moved between environments without impinging upon the integrity of the vehicle to prevent unwanted entry of intruders and without undue exposure of the vehicle interior to the elements.

Figure 20:
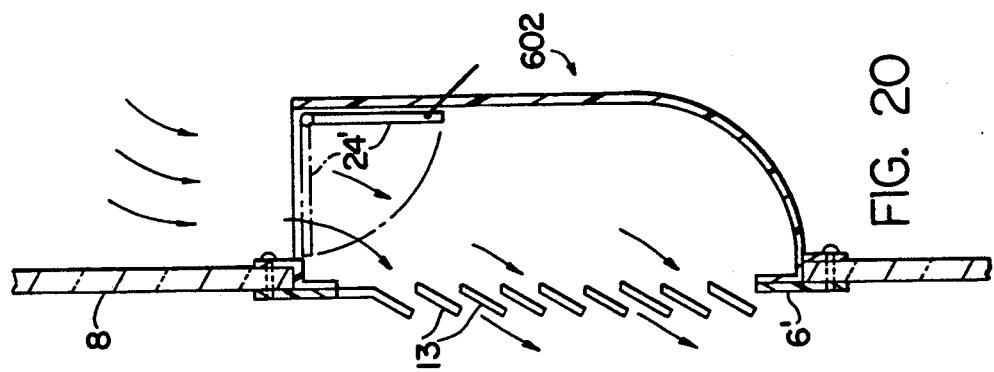
FIG. 20 is a vertical section taken through another embodiment of the present invention illustrating a static ventilator.

As is shown in FIG. 20, a static ventilator illustrated generally as 602 may employ essentially the identical housing previously referenced in FIG. 4 absent the partition wall 15 mounting the powered impeller components 40 and 38.

Figure 22:
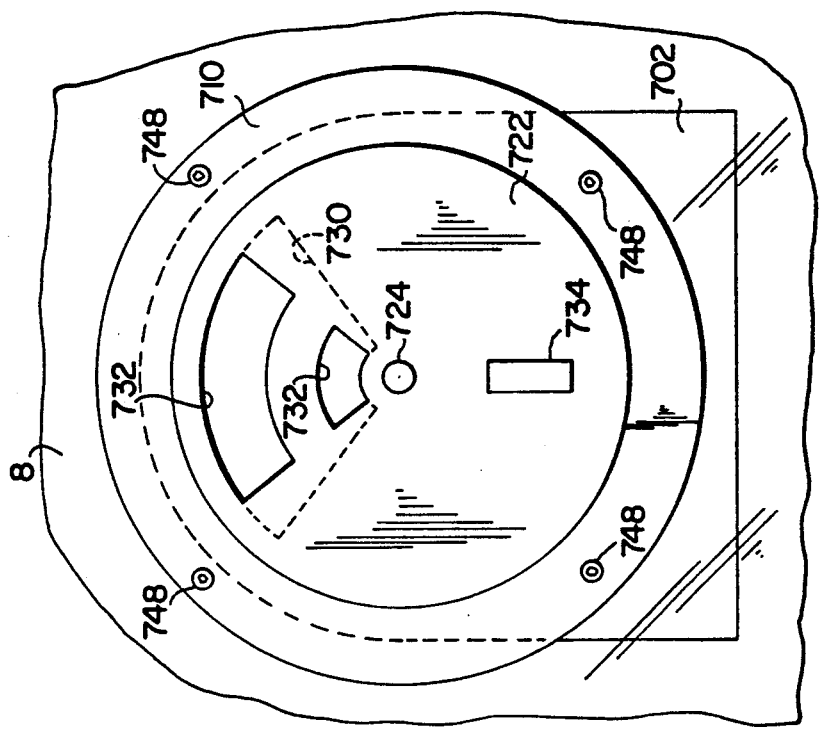
FIG. 22 is a rear elevation view of the static ventilator of FIG. 21 showing the rotatable damper in its open position.
Figure 21:
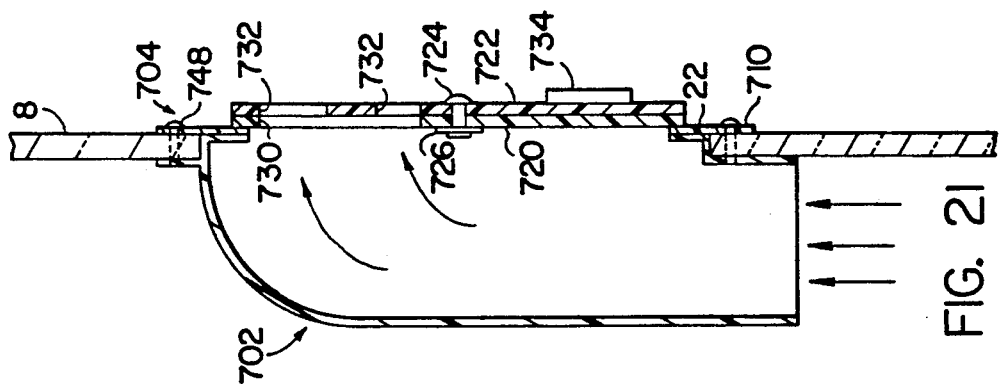
FIG. 21 is a vertical section taken through another embodiment of a static ventilator having a rotatable damper.

FIGS. 21 and 22 a show a preferred embodiment of a static ventilator comprised generally of an outer part 702 and an inner rotatable damper part 704. The outer housing part 702 is essentially identical with the outer housing part 4 referenced in FIG. 4 absent the pivotal damper 24. The inner housing part 704 however, comprises an annularly extending flange 710 which surrounds an opening 22 formed in the support 8. The flange 710 is rigidly connected with the outer housing part 702 with fasteners 748. A base plate 720 having a vent port 730 formed therethrough is fixed to the inwardly extending portion of the annular flange 710 such that the vent port 730 is positioned adjoined with the opening 22 in the support 8.

Positioned adjacent the base plate 720 is a selector plate 722 rotatably mounted on a pin 724 such that a compression washer 726 draws the selector plate 722 toward the base plate 720 in a frictional relationship. The selector plate 722 has formed through its thickness control openings 732 which selectively and variably restrict the flow of air through the opening 22. A control knob 734 is fixed to the inside surface of the selector plate 722 such that a user may rotate the selector plate 722 relative to the base 720 to vary the alignment between the control openings 732 and the vent duct 730 to selectively limit or increase the amount of air flow into or out of the vehicle cabin.

Figure 23:
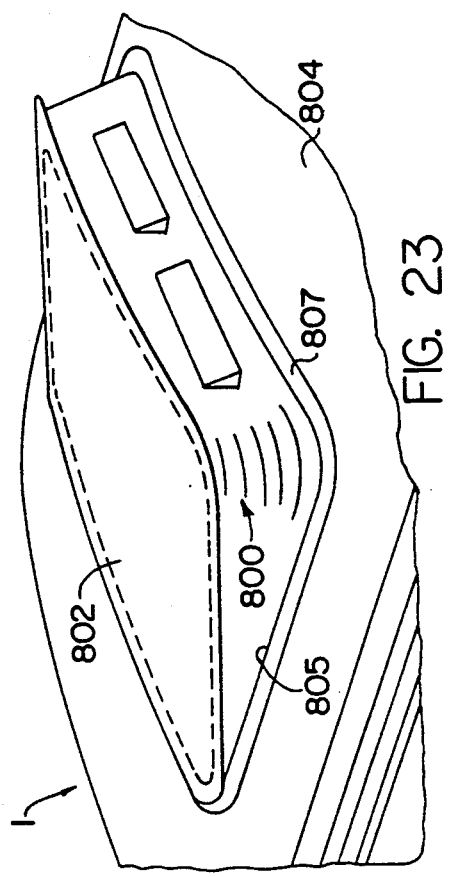
FIG. 23 is a perspective view of a ventilator insert as shown in use with a hinged type sunroof.

Referring now to FIGS. 23-29, it should be seen that in FIG. 23 an insert 800 is provided and is adapted to be received within the generally wedged-shaped confine provided by a hinged sunroof glass 802 so mounted to a vehicular roof 804. The roof 804 has an opening 805 formed in it and the sunroof 802 is correspondingly sized to fit within the opening 805 and be engaged by a circumferentially oriented gasket 807 when in its closed sealed condition.

Figure 24:
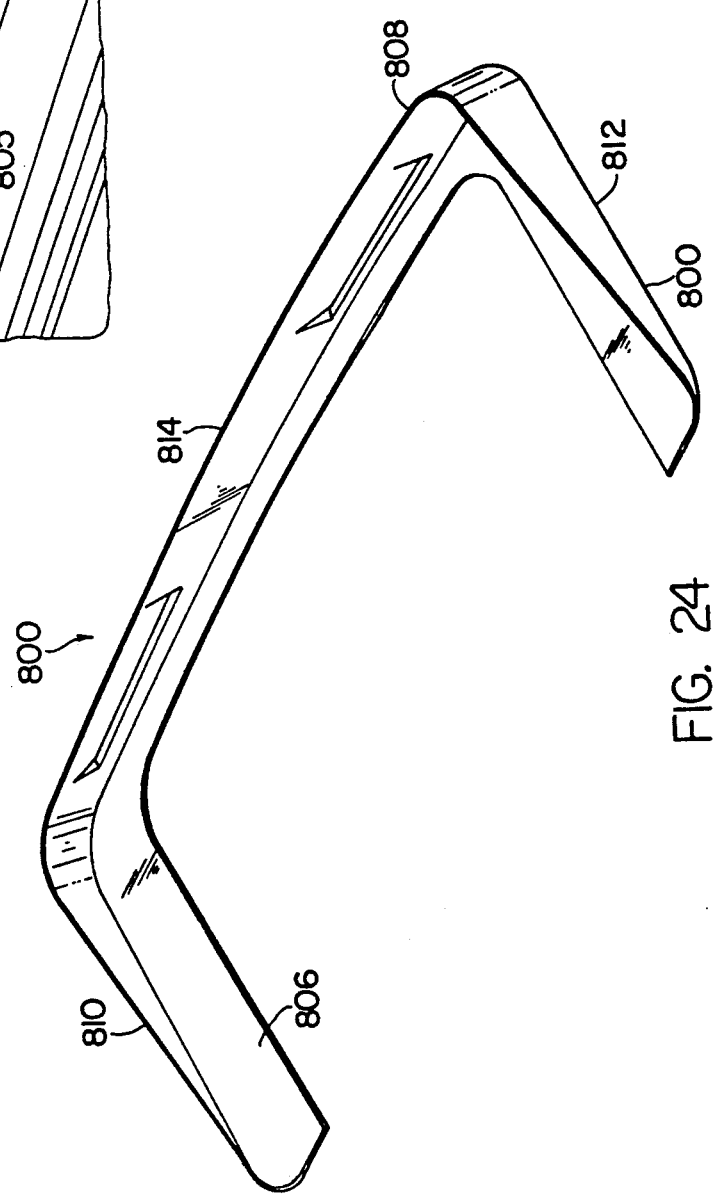
FIG. 24 is a perspective view of the insert shown in FIG. 23 shown separately.

As seen in FIG. 24, the insert 800 is comprised of a base portion 806 adapted to cooperate and be supported by the roof 804 of the vehicle and has a continuous upstanding wall portion 808 adapted to engage with and support the sunroof 802. The insert 800 is a generally U-shaped member having a first elongate part 810 and an oppositely disposed second elongate part 812 interconnected and maintained in a parallel spatial relationship by a transverse part 814 integrally connected therewith. The base portion 806 of the insert 800 is contiguous with the upstanding wall portion 808 throughout the first and second elongate parts and the transverse part 814 so as to create a free-standing structure. The upstanding side wall 808 has a gasket G formed continuously along its upper edge for the purpose of resiliently supporting in sealing engagement with the under surface U of the sunroof 802.

Figure 25A:
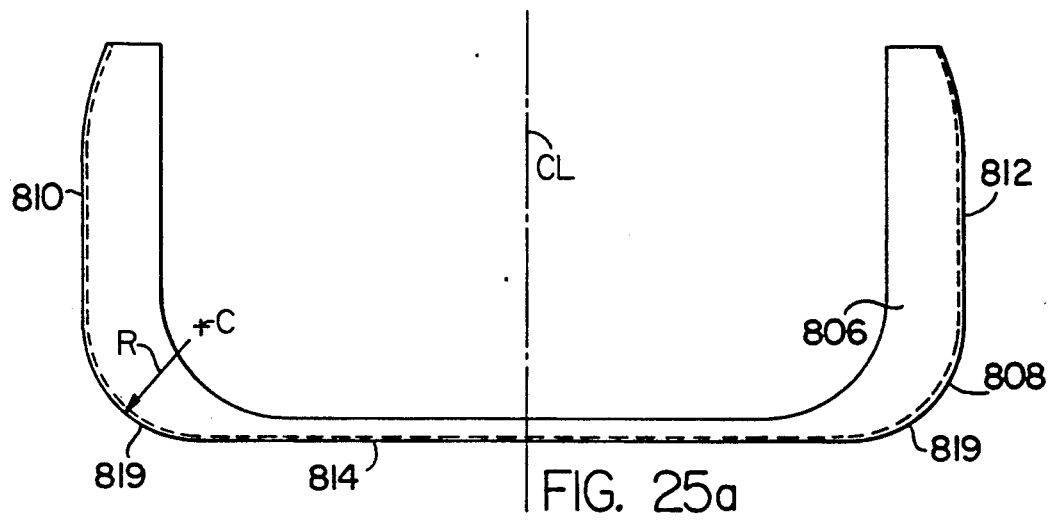
FIG. 25a is a bottom view of the insert shown in FIG. 24.
Figure 25B:
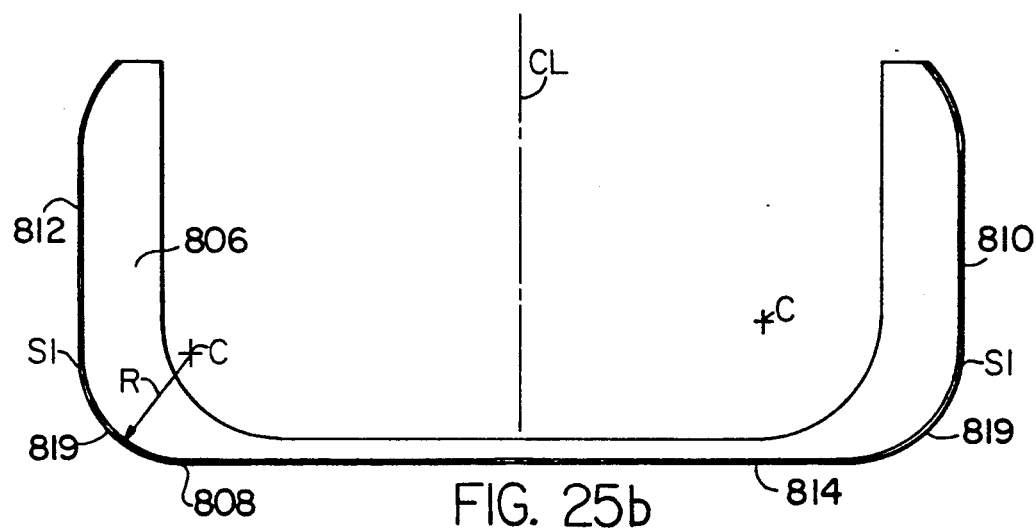
FIG. 25b is a top plan view of the insert shown in FIG. 24.
Figure 25C:
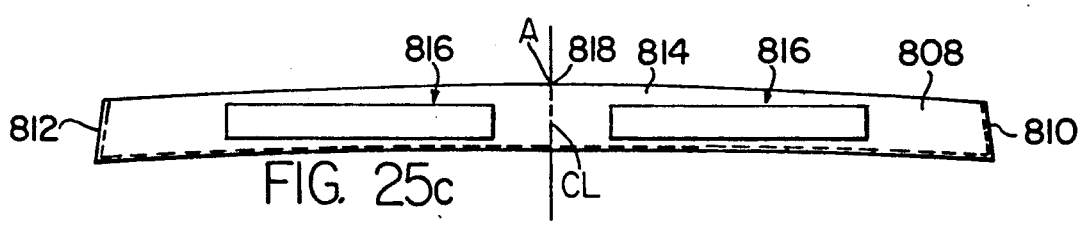
FIG. 25c is a rear elevational view of the insert shown in FIG. 24.

The base 806 circumscribes a generally U-shaped passage or cut-out for fitting over the opening 805 formed in the roof 804 of the vehicle 1. As will be discussed further with respect to FIGS. 29a-29c, the base portion 806 along its interior periphery, rests on the gasket 807 without substantially interfering with the flow of air through the opening 805. As shown in FIG. 25c, the transversely extending part 814 includes two vents 816, 816 defined by rectangular openings formed in a portion of the upstanding wall 808 which makes up this part of the insert for allowing air to communicate between an external environment and the vehicle interior when the insert is mounted in the vehicle 1 in a manner shown in FIG. 23.

The portion of the upstanding wall 808 which constitutes transverse part 814 is defined by a back wall 822 having a crowned upper surface extending from a lowermost position adjacent each of the first and second elongate parts 810, 812 and gradually curving to its apex A located coincidentally with the centerline CL of the insert which is coincidental with its symmetrical. The crown 818 is provided to conform to the correspondingly concave underlying surface of the sunroof glass 802. As seen more particularly in FIG. 26, the crown 818 begins its upward slope at a point S1 along the length of the upstanding wall 808 located on the first and second elongate parts 810 and 812. This connection, as shown more particularly in FIG. 25, is effected through the intermediary of connecting portions 819, 819 having a radius of curvature R centered at a point C and interconnecting the elongate parts 810 and 812 with the transverse part 814 integrally with one another along the upstanding wall 808. The sections 819, 819 simultaneously curve in two planes thus providing an underlying surface upon which the sun roof 802 rests as the upstanding wall 808 makes a ninety degree change in direction.

Referring back to FIG. 26, it should be seen that each of the first and second elongated parts 810 and 812 is comprised of a generally wedged-shaped side wall 820 having an angle Z in the illustrated embodiment equalling approximately 8 degrees. The top surface T of each of the side walls 820, 820 is disposed ninety degree relative to the back wall 822. The openings 816, 816 comprise vents as shown more particularly in FIG. 26, and are formed from an overhang portion 824 directed angularly outwardly of the otherwise straight back wall 822 creating a downwardly directed outwardly facing opening 826 for the vent 816. The overhang portion 824 is supported in this condition by support walls 828 integrally connected with it and to the back wall 822. For preventing the passage of particulates through the openings 816, a screen may be provide for this purpose.

Figure 27:
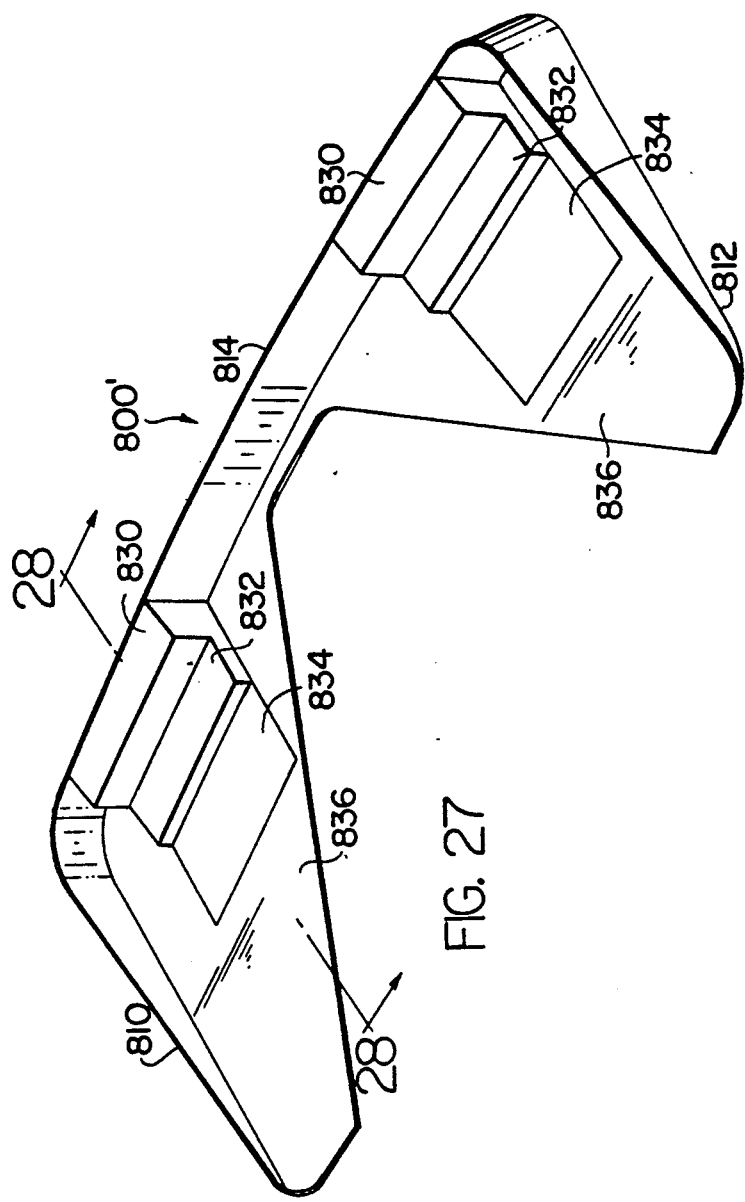
FIG. 27 is an alternative embodiment of the insert shown in FIG. 24 wherein the insert is further provided with a solar powered air moving means.
Figure 26:
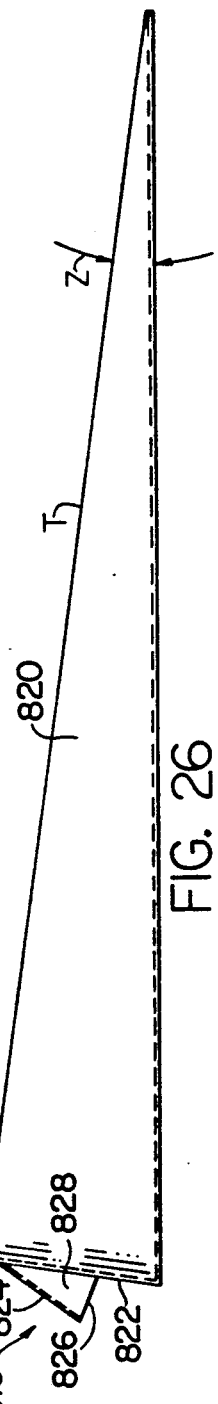
FIG. 26 is a side elevational view of the insert shown in FIG. 24.

In FIG. 27 an alternate embodiment 800' of the insert is shown, and it should be seen that in this embodiment the insert is provided with a positive means for moving air flow from the interior of the vehicle to its outward environment. In this embodiment, the base portion 836 is defined by two flange members giving the base a general V-shape which interconnect the elongate parts 810, 812 respectively along the length of the transverse part 814 at right angles. Each of the vent openings 816, 816 is in communication with a blower means 830 connected in turn to a rechargeable battery pack 832 in turn connected to a solar panel 834. The panels 834, 834 are so situated on the base portion 836 as to be exposed to the radiant energy of the sun when the insert 800' is mounted in the condition shown in FIG. 23. The blower 830 is one which may be downsized widthwise of that shown in FIG. 19 and the circuitry provided for this purpose may be one similar to that shown in FIG. 10 but absent an on/off switch. The base 836 has openings 838, 838 as shown in FIG. 28 positioned below each of the blowers 830, 830 for drawing air out of the internal confines as shown by arrows O and forcing it out of the insert 800' as exhaust as represented by arrows E.

Referring now to FIGS. 29a-29c, it should be seen that a means 840 is provided for releasably securing the insert 800, 800' to the vehicle structure. This means includes an upper plastic resilient clip 842 and a lower resilient clip 844 adapted respectively to engage the trailing edge of the sunroof 802 and the roof structure 804 defining the opening 805. As seen in FIG. 29b, the upper clip 842 may be secured to the transversely extending back wall 822 by conventional means, such as a screw or a bonding adhesive. The lower clip 844 is likewise a generally U-shaped resilient plastic clip which is adapted to grip a portion of the base 806, 836 disposed adjacent the gasket 807.

By the foregoing, a parked car ventilator and related system in which the invention is embodied have been disclosed. However, numerous modifications and substitutions may be made without deviating from the scope of the invention. For example, the impeller motor 40 may be powered directly by the vehicle battery instead of by an independent voltage source. Also, if desired, the mechanism for opening and closing the dampers 24 in the related embodiments are not restricted to the magnetic spring concept but rather could alternatively be opened and closed by an electrical solenoid or a temperature sensitive thermostat. Therefore, the invention has been disclosed by way of illustration and not limitation.

I claim:

1. A generally U-shaped insert for use with a hinged type sunroof in a vehicle, said insert comprising:
    a first elongate part and a second elongate part each disposed substantially parallel to one another;
    a transversely extending part integrally connected with one end of each of said first and second elongate parts;
    said first and second elongate parts and said transversely extending part being comprised by a continuous upstanding wall portion and a base portion integrally connected to one another to create a self-standing structure;
    said upstanding wall portion of each of said first and second elongated parts being comprised of a side wall having a leading end and a trailing end, the trailing end of which being integrally connected with the transversely extending part, each of said side walls beginning at its leading edge and ending in its trailing edge having a generally wedge-shape sloping upwardly therefrom, said insert being received within the generally wedged-shaped confine provided by the hinged sunroof; and
    at least one opening formed in said upstanding wall portion for permitting air passage between an internal environment of a vehicle and an external environment separated from the internal environment by said insert.

2. An insert as defined in claim 1 further characterized in that said transversely extending part is defined by a back wall constituting a portion of said continuous upstanding wall and wherein said at least one opening is formed in said back wall.

3. An insert as defined in claim 2 further characterized in that said back wall has two rectangular shaped vents each of which is defined by an overhang portion angled outwardly and downwardly from the remaining extent of said back wall and being maintained in said rectangular configuration by outwardly extending supporting walls.

4. An insert as defined in claim 3 further characterized in that said insert is formed as integral member made from polyvinyl chloride.

5. An insert as defined in claim 2 further characterized in that said first and second elongate parts are integrally connected with said transversely extending part through the intermediary of a portion curved in two planes and constituting part of said contiguous upstanding wall.

6. An insert as defined in claim 5 further characterized in that said back wall along its upper edge has a crowned surface sloping upwards from each end of where said connecting portions connect with said back wall.

7. An insert as defined in claim 3 further characterized in that associated with each of said vents in said back wall are a means for pushing air under power from the internal confines of a vehicle outwardly thereof.

8. An insert as defined in claim 7 further characterized in that said base portion underlies and supports said means for moving air under power; and
    wherein the area of said base underlying said air moving means has means formed therein for communicating air to said air moving means and outwardly thereof through said at least one opening formed in said rear upstanding wall.

9. An insert as defined in claim 8 further characterized in that said air moving means further includes an impeller means and an electrical power means; and
    wherein said electrical power means includes a solar panel so positioned on said base as to be exposed to radiant energy when the insert is mounted in the vehicle, said air moving means further including a voltage storage cell supported by said base.

10. An insert as defined in claim 9 further characterized in that said base portion has a generally V-shaped configuration.

11. An insert as defined in claim 3 further characterized in that said base conscribes a generally U-shape.

12. An insert as defined in claim 1 further characterized by first and second clips provided for attaching said transversely extending part of said insert to a sunroof panel and a second clip for attaching the base part to the structure a vehicle.

* * * * *